US007650425B2

(12) United States Patent
Davis et al.

(10) Patent No.: US 7,650,425 B2
(45) Date of Patent: *Jan. 19, 2010

(54) SYSTEM AND METHOD FOR CONTROLLING COMMUNICATION BETWEEN A HOST COMPUTER AND COMMUNICATION DEVICES ASSOCIATED WITH REMOTE DEVICES IN AN AUTOMATED MONITORING SYSTEM

(75) Inventors: James Davis, Woodstock, GA (US); Thomas D. Petite, Douglasville, GA (US)

(73) Assignee: Sipco, LLC, Atlanta, GA (US)

( * ) Notice: Subject to any disclaimer, the term of this patent is extended or adjusted under 35 U.S.C. 154(b) by 43 days.

This patent is subject to a terminal disclaimer.

(21) Appl. No.: 09/925,786

(22) Filed: Aug. 9, 2001

(65) Prior Publication Data
US 2002/0027504 A1   Mar. 7, 2002

Related U.S. Application Data

(63) Continuation-in-part of application No. 09/271,517, filed on Mar. 18, 1999, now abandoned, and a continuation-in-part of application No. 09/439,059, filed on Nov. 12, 1999, now Pat. No. 6,437,692, and a continuation-in-part of application No. 09/812,809, filed on Mar. 20, 2001, now abandoned, which is a continuation-in-part of application No. 09/412,895, filed on Oct. 5, 1999, now Pat. No. 6,218,953.

(60) Provisional application No. 60/223,943, filed on Aug. 9, 2000.

(51) Int. Cl.
*G06F 15/173* (2006.01)

(52) U.S. Cl. ..................... 709/238

(58) Field of Classification Search ......... 709/201–203, 709/217–219, 224, 249, 250, 238; 340/853.1, 340/870.02
See application file for complete search history.

(56) References Cited

U.S. PATENT DOCUMENTS
3,665,475 A    5/1972  Gram
(Continued)

FOREIGN PATENT DOCUMENTS
EP    0718954    6/1996
(Continued)

OTHER PUBLICATIONS
Royer, et al "A Review of Current Routing Protocols for Ad Hoc Mobile Wireless Networks", Apr. 1999, IEEE Personal Communications, vol. 6, Issue 2, pp. 46-55.*
(Continued)

*Primary Examiner*—Kenny S Lin
*Assistant Examiner*—Julian Chang
(74) *Attorney, Agent, or Firm*—Troutman Sanders LLP; Filip A. Kowalewski; James H. Yancey, Jr.

(57) ABSTRACT

A site controller adapted to be used in an automated monitoring system for monitoring and controlling a plurality of remote devices via a host computer connected to a first communication network is provided. The site controller is configured for controlling communication with the host computer and a plurality of communication devices that define a second communication network associated with the plurality of remote devices. Briefly described, in one embodiment, the site controller comprises a transceiver configured to communicate with the plurality of communication devices via the second communication network; a network interface device configured to communicate with the host computer via the first communication network; and logic configured to: manage communication with each of the plurality of communication devices, via a first communication protocol, based on one or more communication paths for each of the plurality of communication devices, each communication path comprising one or more communication devices involved in the communication link between the transceiver and each of the plurality of communication devices; and manage communication with the host computer via a second communication protocol.

12 Claims, 7 Drawing Sheets

U.S. PATENT DOCUMENTS

| | | | |
|---|---|---|---|
| 3,705,385 A | 12/1972 | Batz | |
| 3,723,876 A | 3/1973 | Seaborn, Jr. | |
| 3,742,142 A | 6/1973 | Martin | |
| 3,848,231 A | 11/1974 | Wooten | |
| 3,892,848 A | 7/1975 | Constable | |
| 3,906,460 A | 9/1975 | Halpern | |
| 3,914,692 A | 10/1975 | Seaborn, Jr. | |
| 3,922,492 A | 11/1975 | Lumsden | |
| 3,925,763 A | 12/1975 | Wadwhani et al. | |
| 4,025,315 A | 5/1977 | Mazelli | |
| 4,056,684 A | 11/1977 | Lindstrom | |
| 4,058,672 A | 11/1977 | Crager et al. | |
| 4,083,003 A | 4/1978 | Haemmig | |
| 4,120,452 A | 10/1978 | Kimura et al. | |
| 4,124,839 A | 11/1978 | Cohen | |
| 4,135,181 A | 1/1979 | Bogacki et al. | |
| 4,204,195 A | 5/1980 | Bogacki | |
| 4,213,119 A | 7/1980 | Ward et al. | |
| 4,277,837 A | 7/1981 | Stuckert | |
| 4,278,975 A | 7/1981 | Kimura et al. | |
| 4,354,181 A | 10/1982 | Spletzer | 340/642 |
| 4,396,910 A | 8/1983 | Enemark et al. | |
| 4,396,915 A | 8/1983 | Farnsworth et al. | |
| 4,417,450 A | 11/1983 | Morgan, Jr. et al. | |
| 4,436,957 A | 3/1984 | Mazza | |
| 4,446,454 A | 5/1984 | Pyle | |
| 4,446,458 A | 5/1984 | Cook | |
| 4,454,414 A | 6/1984 | Benton | |
| 4,468,656 A | 8/1984 | Clifford et al. | |
| 4,488,152 A | 12/1984 | Arnason et al. | |
| 4,495,496 A | 1/1985 | Miller, III | |
| 4,551,719 A | 11/1985 | Carlin et al. | |
| 4,611,198 A | 9/1986 | Levinson et al. | |
| 4,621,263 A | 11/1986 | Takenaka et al. | |
| 4,630,035 A | 12/1986 | Stahl et al. | 340/539 |
| 4,631,357 A | 12/1986 | Grunig | |
| 4,670,739 A | 6/1987 | Kelly, Jr. | |
| 4,692,761 A | 9/1987 | Robinton | |
| 4,707,852 A | 11/1987 | Jahr et al. | |
| 4,731,810 A | 3/1988 | Watkins | |
| 4,742,296 A | 5/1988 | Petr et al. | |
| 4,757,185 A | 7/1988 | Onishi | |
| 4,788,721 A | 11/1988 | Krishnan et al. | |
| 4,800,543 A | 1/1989 | Lyndon-James et al. | |
| 4,825,457 A | 4/1989 | Lebowitz | |
| 4,829,561 A | 5/1989 | Matheny | |
| 4,849,815 A | 7/1989 | Streck | |
| 4,851,654 A | 7/1989 | Nitta | |
| 4,856,046 A | 8/1989 | Streck et al. | |
| 4,857,912 A | 8/1989 | Everett, Jr. et al. | 340/825.3 |
| 4,875,231 A | 10/1989 | Hara et al. | |
| 4,884,123 A | 11/1989 | Morris et al. | |
| 4,897,644 A | 1/1990 | Hirano | |
| 4,906,828 A | 3/1990 | Halpern | |
| 4,908,769 A | 3/1990 | Vaughan et al. | |
| 4,918,690 A | 4/1990 | Markkula, Jr. et al. | |
| 4,918,995 A | 4/1990 | Pearman et al. | |
| 4,928,299 A | 5/1990 | Tansky et al. | |
| 4,939,726 A | 7/1990 | Flammer et al. | |
| 4,940,976 A | 7/1990 | Gastouniotis et al. | |
| 4,949,077 A | 8/1990 | Mbuthia | |
| 4,952,928 A | 8/1990 | Carroll et al. | |
| 4,962,496 A | 10/1990 | Vercellotti et al. | |
| 4,967,366 A | 10/1990 | Kaehler | |
| 4,968,970 A | 11/1990 | LaPorte | |
| 4,968,978 A | 11/1990 | Stolarczyk | |
| 4,972,504 A | 11/1990 | Daniel, Jr. et al. | |
| 4,973,957 A | 11/1990 | Shimizu et al. | |
| 4,973,970 A | 11/1990 | Reeser | |
| 4,977,612 A | 12/1990 | Wilson | |
| 4,980,907 A | 12/1990 | Raith et al. | |
| 4,989,230 A | 1/1991 | Gillig et al. | |
| 4,991,008 A | 2/1991 | Nama | |
| 4,993,059 A | 2/1991 | Smith et al. | |
| 4,998,095 A | 3/1991 | Shields | |
| 4,999,607 A | 3/1991 | Evans | |
| 5,007,052 A | 4/1991 | Flammer | |
| 5,032,833 A | 7/1991 | Laporte | |
| 5,038,372 A | 8/1991 | Elms et al. | |
| 5,055,851 A | 10/1991 | Sheffer | |
| 5,057,814 A | 10/1991 | Onan et al. | 340/458 |
| 5,061,997 A | 10/1991 | Rea et al. | 358/108 |
| 5,079,768 A | 1/1992 | Flammer | |
| 5,086,391 A | 2/1992 | Chambers | |
| 5,091,713 A | 2/1992 | Horne et al. | 340/541 |
| 5,111,199 A | 5/1992 | Tomoda et al. | |
| 5,113,183 A | 5/1992 | Mizuno et al. | |
| 5,113,184 A | 5/1992 | Katayama | |
| 5,115,224 A | 5/1992 | Kostusiak et al. | |
| 5,115,433 A | 5/1992 | Baran et al. | |
| 5,124,624 A | 6/1992 | de Vries et al. | |
| 5,128,855 A | 7/1992 | Hilber et al. | |
| 5,130,519 A | 7/1992 | Bush et al. | |
| 5,130,987 A | 7/1992 | Flammer | |
| 5,131,038 A | 7/1992 | Puhl et al. | |
| 5,134,650 A | 7/1992 | Blackmon | |
| 5,136,285 A | 8/1992 | Okuyama | |
| 5,155,481 A | 10/1992 | Brennan, Jr. et al. | |
| 5,159,317 A | 10/1992 | Brav | |
| 5,162,776 A | 11/1992 | Bushnell et al. | |
| 5,177,342 A | 1/1993 | Adams | |
| 5,189,287 A | 2/1993 | Parienti | |
| 5,191,192 A | 3/1993 | Takahira et al. | |
| 5,191,326 A | 3/1993 | Montgomery | |
| 5,193,111 A | 3/1993 | Matty et al. | |
| 5,195,018 A | 3/1993 | Kwon et al. | |
| 5,197,095 A | 3/1993 | Bonnet et al. | |
| 5,200,735 A * | 4/1993 | Hines | 340/539.11 |
| 5,204,670 A | 4/1993 | Stinton | |
| 5,212,645 A | 5/1993 | Wildes et al. | |
| 5,216,502 A | 6/1993 | Katz | |
| 5,221,838 A | 6/1993 | Gutman et al. | |
| 5,223,844 A | 6/1993 | Mansell et al. | |
| 5,231,658 A | 7/1993 | Eftechiou | |
| 5,235,630 A | 8/1993 | Moody et al. | |
| 5,239,294 A | 8/1993 | Flanders et al. | |
| 5,239,575 A | 8/1993 | White et al. | |
| 5,241,410 A | 8/1993 | Streck et al. | |
| 5,243,338 A | 9/1993 | Brennan, Jr. et al. | |
| 5,245,633 A | 9/1993 | Schwartz et al. | |
| 5,251,205 A * | 10/1993 | Callon et al. | 370/392 |
| 5,252,967 A | 10/1993 | Brennan et al. | |
| 5,253,167 A | 10/1993 | Yoshida et al. | 364/408 |
| 5,265,150 A | 11/1993 | Heimkamp et al. | |
| 5,265,162 A | 11/1993 | Bush et al. | |
| 5,266,782 A | 11/1993 | Alanara et al. | |
| 5,272,747 A | 12/1993 | Meads | |
| 5,282,204 A | 1/1994 | Shpancer et al. | |
| 5,282,250 A | 1/1994 | Dent et al. | |
| 5,289,165 A | 2/1994 | Belin | |
| 5,291,516 A | 3/1994 | Dixon et al. | |
| 5,295,154 A | 3/1994 | Meier et al. | |
| 5,305,370 A | 4/1994 | Kearns et al. | |
| 5,309,501 A | 5/1994 | Kozik et al. | |
| 5,315,645 A | 5/1994 | Matheny | |
| 5,317,309 A | 5/1994 | Vercellotti et al. | |
| 5,319,364 A | 6/1994 | Waraksa et al. | |
| 5,319,698 A * | 6/1994 | Glidewell et al. | 379/39 |
| 5,319,711 A | 6/1994 | Servi | |
| 5,323,384 A | 6/1994 | Norwood et al. | |
| 5,325,429 A | 6/1994 | Kurgan | |
| 5,329,394 A | 7/1994 | Calvani et al. | |
| 5,331,318 A | 7/1994 | Montgomery | |
| 5,334,974 A | 8/1994 | Simms et al. | |

| Patent | Date | Inventor |
|---|---|---|
| 5,335,265 A | 8/1994 | Cooper et al. |
| 5,343,493 A | 8/1994 | Karimullah |
| 5,345,231 A | 9/1994 | Koo et al. |
| 5,345,595 A | 9/1994 | Johnson et al. |
| 5,347,263 A | 9/1994 | Carroll et al. |
| 5,354,974 A | 10/1994 | Eisenberg |
| 5,355,278 A | 10/1994 | Hosoi et al. |
| 5,355,513 A | 10/1994 | Clarke et al. |
| 5,365,217 A | 11/1994 | Toner |
| 5,371,736 A | 12/1994 | Evan |
| 5,382,778 A | 1/1995 | Takahira et al. |
| 5,383,134 A | 1/1995 | Wrzesinski |
| 5,390,206 A | 2/1995 | Rein |
| 5,406,619 A | 4/1995 | Akhteruzzaman et al. |
| 5,412,192 A | 5/1995 | Hoss |
| 5,412,760 A | 5/1995 | Peitz |
| 5,416,475 A | 5/1995 | Tolbert et al. |
| 5,416,725 A | 5/1995 | Pacheco et al. |
| 5,418,812 A | 5/1995 | Reyes et al. |
| 5,420,910 A | 5/1995 | Rudokas et al. |
| 5,424,708 A | 6/1995 | Ballesty et al. |
| 5,432,507 A | 7/1995 | Mussino et al. |
| 5,438,329 A * | 8/1995 | Gastouniotis et al. .. 340/870.02 |
| 5,439,414 A | 8/1995 | Jacob |
| 5,440,545 A | 8/1995 | Buchholz et al. |
| 5,442,553 A | 8/1995 | Parrillo |
| 5,445,287 A | 8/1995 | Center et al. |
| 5,445,347 A | 8/1995 | Ng |
| 5,451,929 A | 9/1995 | Adelman et al. |
| 5,451,938 A | 9/1995 | Brennan, Jr. |
| 5,452,344 A | 9/1995 | Larson |
| 5,454,024 A | 9/1995 | Lebowitz |
| 5,465,401 A | 11/1995 | Thompson |
| 5,467,074 A | 11/1995 | Pedtke |
| 5,467,082 A | 11/1995 | Sanderson |
| 5,467,345 A | 11/1995 | Cutler et al. |
| 5,468,948 A | 11/1995 | Koenck et al. |
| 5,471,201 A | 11/1995 | Cerami et al. ............... 340/641 |
| 5,473,322 A | 12/1995 | Carney |
| 5,475,689 A | 12/1995 | Kay et al. |
| 5,481,259 A | 1/1996 | Bane |
| 5,481,532 A | 1/1996 | Hassan et al. |
| 5,484,997 A | 1/1996 | Haynes |
| 5,488,608 A | 1/1996 | Flammer, III |
| 5,493,273 A | 2/1996 | Smurlo et al. |
| 5,493,287 A | 2/1996 | Bane |
| 5,502,726 A | 3/1996 | Fischer |
| 5,506,837 A | 4/1996 | Sollner et al. |
| 5,509,073 A | 4/1996 | Monnin |
| 5,513,244 A | 4/1996 | Joao et al. |
| 5,515,419 A | 5/1996 | Sheffer ........................ 379/58 |
| 5,517,188 A | 5/1996 | Carroll et al. |
| 5,522,089 A | 5/1996 | Kikinis et al. |
| 5,528,215 A | 6/1996 | Siu et al. |
| 5,539,825 A | 7/1996 | Akiyama et al. |
| 5,541,938 A | 7/1996 | Di Zenzo et al. |
| 5,542,100 A | 7/1996 | Hatakeyama |
| 5,544,036 A | 8/1996 | Brown, Jr. et al. |
| 5,544,784 A | 8/1996 | Malaspina |
| 5,548,632 A | 8/1996 | Walsh et al. |
| 5,550,358 A | 8/1996 | Tait et al. |
| 5,550,359 A | 8/1996 | Bennett |
| 5,550,535 A | 8/1996 | Park |
| 5,553,094 A | 9/1996 | Johnson et al. |
| 5,555,258 A | 9/1996 | Snelling et al. |
| 5,555,286 A | 9/1996 | Tendler |
| 5,562,537 A | 10/1996 | Zver et al. |
| 5,565,857 A | 10/1996 | Lee |
| 5,568,535 A | 10/1996 | Sheffer et al. |
| 5,570,084 A | 10/1996 | Ritter et al. |
| 5,572,438 A | 11/1996 | Ehlers et al. |
| 5,573,181 A | 11/1996 | Ahmed |
| 5,574,111 A | 11/1996 | Brichta et al. |
| 5,583,850 A | 12/1996 | Snodgrass et al. |
| 5,587,705 A | 12/1996 | Morris |
| 5,589,878 A | 12/1996 | Cortjens et al. ............. 348/211 |
| 5,590,038 A | 12/1996 | Pitroda |
| 5,590,179 A | 12/1996 | Shincovich et al. |
| 5,592,491 A | 1/1997 | Dinks |
| 5,594,431 A | 1/1997 | Sheppard et al. |
| 5,596,719 A | 1/1997 | Ramakrishnan et al. |
| 5,602,843 A | 2/1997 | Gray |
| 5,604,414 A | 2/1997 | Milligan et al. |
| 5,604,869 A | 2/1997 | Mincher et al. |
| 5,606,361 A | 2/1997 | Davidsohn et al. |
| 5,608,786 A | 3/1997 | Gordon |
| 5,613,620 A | 3/1997 | Center et al. |
| 5,615,277 A | 3/1997 | Hoffman |
| 5,619,192 A | 4/1997 | Ayala |
| 5,625,410 A * | 4/1997 | Washino et al. ............. 348/154 |
| 5,628,050 A | 5/1997 | McGraw et al. |
| 5,629,687 A | 5/1997 | Sutton et al. |
| 5,629,875 A | 5/1997 | Adair, Jr. |
| 5,630,209 A | 5/1997 | Wizgall et al. |
| 5,631,554 A | 5/1997 | Briese et al. |
| 5,636,216 A | 6/1997 | Fox et al. |
| 5,640,002 A | 6/1997 | Ruppert et al. |
| 5,644,294 A | 7/1997 | Ness |
| 5,655,219 A | 8/1997 | Jusa et al. |
| 5,657,389 A | 8/1997 | Houvener |
| 5,659,300 A | 8/1997 | Dresselhuys et al. |
| 5,659,303 A | 8/1997 | Adair, Jr. |
| 5,668,876 A | 9/1997 | Falk et al. |
| 5,673,252 A * | 9/1997 | Johnson et al. ............. 370/449 |
| 5,673,304 A | 9/1997 | Connor et al. |
| 5,673,305 A | 9/1997 | Ross |
| 5,682,139 A | 10/1997 | Pradeep et al. ............. 340/539 |
| 5,682,476 A * | 10/1997 | Tapperson et al. .......... 370/225 |
| 5,689,229 A | 11/1997 | Chaco et al. |
| 5,699,328 A | 12/1997 | Ishizaki et al. |
| 5,701,002 A | 12/1997 | Oishi et al. |
| 5,702,059 A | 12/1997 | Chu et al. |
| 5,704,046 A | 12/1997 | Hogan |
| 5,704,517 A | 1/1998 | Lancaster, Jr. |
| 5,706,191 A | 1/1998 | Bassett et al. |
| 5,706,976 A | 1/1998 | Purkey |
| 5,708,223 A | 1/1998 | Wyss |
| 5,708,655 A | 1/1998 | Toth |
| 5,712,619 A | 1/1998 | Simkin |
| 5,712,980 A | 1/1998 | Beeler et al. |
| 5,714,931 A | 2/1998 | Petite et al. |
| 5,717,718 A | 2/1998 | Rowsell et al. |
| 5,726,634 A | 3/1998 | Hess et al. |
| 5,726,984 A | 3/1998 | Kubler et al. |
| 5,732,074 A * | 3/1998 | Spaur et al. ................. 370/313 |
| 5,732,078 A | 3/1998 | Arango |
| 5,736,965 A | 4/1998 | Mosebrook et al. |
| 5,740,232 A | 4/1998 | Pailles et al. |
| 5,742,509 A | 4/1998 | Goldberg et al. |
| 5,745,849 A | 4/1998 | Britton |
| 5,748,104 A | 5/1998 | Argyroudis et al. |
| 5,748,619 A | 5/1998 | Meier |
| 5,754,111 A | 5/1998 | Garcia |
| 5,754,227 A | 5/1998 | Fukuoka ...................... 348/232 |
| 5,757,783 A | 5/1998 | Eng et al. |
| 5,757,788 A | 5/1998 | Tatsumi et al. |
| 5,761,083 A | 6/1998 | Brown, Jr. et al. |
| 5,764,742 A | 6/1998 | Howard et al. |
| 5,767,791 A | 6/1998 | Stoop et al. |
| 5,771,274 A | 6/1998 | Harris |
| 5,774,052 A | 6/1998 | Hamm et al. ................ 340/540 |
| 5,781,143 A | 7/1998 | Rossin |
| 5,790,644 A | 8/1998 | Kikinis |
| 5,790,662 A | 8/1998 | Valerij et al. |
| 5,790,938 A | 8/1998 | Talarmo |
| 5,796,727 A | 8/1998 | Harrison et al. |

| | | | | | |
|---|---|---|---|---|---|
| 5,798,964 A | 8/1998 | Shimizu et al. | 5,995,593 A | 11/1999 | Cho |
| 5,801,643 A | 9/1998 | Williams et al. | 5,997,170 A | 12/1999 | Brodbeck |
| 5,815,505 A | 9/1998 | Mills | 5,999,094 A | 12/1999 | Nilssen |
| 5,818,822 A | 10/1998 | Thomas et al. | 6,005,759 A | 12/1999 | Hart et al. |
| 5,822,273 A | 10/1998 | Bary et al. | 6,005,963 A | 12/1999 | Bolle et al. |
| 5,822,544 A | 10/1998 | Chaco et al. | 6,021,664 A * | 2/2000 | Granato et al. ............. 73/53.01 |
| 5,825,772 A | 10/1998 | Dobbins et al. | 6,023,223 A | 2/2000 | Baxter, Jr. |
| 5,826,195 A | 10/1998 | Westerlage et al. | 6,026,095 A | 2/2000 | Sherer et al. |
| 5,828,044 A | 10/1998 | Jun et al. | 6,028,522 A | 2/2000 | Petite |
| 5,832,057 A | 11/1998 | Furman | 6,028,857 A | 2/2000 | Poor |
| 5,838,223 A | 11/1998 | Gallant et al. | 6,031,455 A | 2/2000 | Grube et al. |
| 5,838,237 A | 11/1998 | Revell et al. | 6,032,197 A | 2/2000 | Birdwell et al. |
| 5,838,812 A | 11/1998 | Pare, Jr. et al. | 6,035,213 A | 3/2000 | Tokuda et al. |
| 5,841,118 A | 11/1998 | East et al. | 6,035,266 A | 3/2000 | Williams et al. |
| 5,841,764 A | 11/1998 | Roderique et al. | 6,036,086 A | 3/2000 | Sizer, II et al. |
| 5,842,976 A | 12/1998 | Williamson | 6,038,491 A | 3/2000 | McGarry et al. |
| 5,844,808 A | 12/1998 | Konsmo et al. | 6,044,062 A | 3/2000 | Brownrigg et al. |
| 5,845,230 A | 12/1998 | Lamberson | 6,054,920 A * | 4/2000 | Smith et al. .................. 340/506 |
| 5,852,658 A | 12/1998 | Knight et al. | 6,060,994 A * | 5/2000 | Chen .......................... 340/521 |
| 5,854,994 A | 12/1998 | Canada et al. | 6,061,604 A | 5/2000 | Russ et al. |
| 5,862,201 A | 1/1999 | Sands | 6,064,318 A * | 5/2000 | Kirchner et al. ............. 340/905 |
| 5,864,772 A | 1/1999 | Alvarado et al. | 6,067,017 A | 5/2000 | Stewart et al. |
| 5,873,043 A | 2/1999 | Comer | 6,067,030 A | 5/2000 | Burnett et al. |
| 5,874,903 A | 2/1999 | Shuey et al. | 6,069,886 A | 5/2000 | Ayerst et al. |
| 5,880,677 A | 3/1999 | Lestician | 6,073,169 A | 6/2000 | Shuey et al. |
| 5,884,184 A | 3/1999 | Sheffer | 6,073,266 A | 6/2000 | Ahmed et al. |
| 5,884,271 A | 3/1999 | Pitroda | 6,073,840 A | 6/2000 | Marion |
| 5,886,333 A | 3/1999 | Miyake | 6,075,451 A | 6/2000 | Lebowitz et al. |
| 5,889,468 A | 3/1999 | Banga | 6,078,251 A | 6/2000 | Landt et al. |
| 5,892,690 A | 4/1999 | Boatman et al. | 6,087,957 A | 7/2000 | Gray |
| 5,892,758 A | 4/1999 | Argyroudis | 6,088,659 A | 7/2000 | Kelley et al. |
| 5,892,924 A * | 4/1999 | Lyon et al. ................... 709/245 | 6,094,622 A | 7/2000 | Hubbard et al. |
| 5,896,097 A | 4/1999 | Cardozo | 6,100,817 A | 8/2000 | Mason, Jr. et al. |
| 5,897,607 A | 4/1999 | Jenney et al. | 6,101,427 A | 8/2000 | Yang |
| 5,898,369 A | 4/1999 | Godwin | 6,101,445 A | 8/2000 | Alvarado et al. |
| 5,905,438 A | 5/1999 | Weiss et al. | 6,112,983 A | 9/2000 | D'Anniballe et al. |
| 5,907,291 A | 5/1999 | Chen et al. | 6,115,580 A | 9/2000 | Chuprun et al. |
| 5,907,491 A * | 5/1999 | Canada et al. .............. 700/108 | 6,119,076 A | 9/2000 | Williams et al. |
| 5,907,540 A | 5/1999 | Hayashi | 6,121,593 A | 9/2000 | Mansbery et al. |
| 5,907,807 A * | 5/1999 | Chavez et al. ............... 455/436 | 6,121,885 A | 9/2000 | Masone et al. |
| 5,914,672 A | 6/1999 | Glorioso et al. | 6,124,806 A * | 9/2000 | Cunningham et al. .. 340/870.02 |
| 5,914,673 A | 6/1999 | Jennings et al. | 6,127,917 A | 10/2000 | Tuttle |
| 5,917,405 A | 6/1999 | Joao | 6,128,551 A * | 10/2000 | Davis et al. .................. 700/236 |
| 5,917,629 A | 6/1999 | Hortensius et al. | 6,130,622 A | 10/2000 | Hussey et al. |
| 5,923,269 A | 7/1999 | Shuey et al. | 6,133,850 A | 10/2000 | Moore |
| 5,926,103 A | 7/1999 | Petite | 6,137,423 A | 10/2000 | Glorioso et al. |
| 5,926,529 A | 7/1999 | Hache et al. | 6,140,975 A | 10/2000 | Cohen |
| 5,926,531 A | 7/1999 | Petite | 6,141,347 A * | 10/2000 | Shaughnessy et al. ........ 370/390 |
| 5,933,073 A | 8/1999 | Shuey | 6,150,936 A | 11/2000 | Addy |
| 5,941,363 A | 8/1999 | Partyka et al. | 6,150,955 A | 11/2000 | Tracy et al. |
| 5,941,955 A | 8/1999 | Wilby et al. | 6,157,464 A | 12/2000 | Bloomfield et al. |
| 5,948,040 A | 9/1999 | DeLorme et al. | 6,157,824 A | 12/2000 | Bailey |
| 5,949,779 A | 9/1999 | Mostafa et al. | 6,163,276 A | 12/2000 | Irving et al. |
| 5,949,799 A | 9/1999 | Grivna et al. | 6,172,616 B1 | 1/2001 | Johnson et al. |
| 5,953,319 A | 9/1999 | Dutta et al. | 6,174,205 B1 | 1/2001 | Madsen et al. |
| 5,953,371 A | 9/1999 | Rowsell et al. | 6,175,922 B1 | 1/2001 | Wang |
| 5,955,718 A | 9/1999 | Levasseur et al. | 6,177,883 B1 | 1/2001 | Jennetti et al. |
| 5,960,074 A | 9/1999 | Clark | 6,181,255 B1 | 1/2001 | Crimmins et al. |
| 5,963,146 A | 10/1999 | Johnson et al. | 6,181,284 B1 | 1/2001 | Madsen et al. |
| 5,963,452 A | 10/1999 | Etoh et al. | 6,181,981 B1 | 1/2001 | Varga et al. |
| 5,963,650 A | 10/1999 | Simionescu et al. | 6,188,354 B1 | 2/2001 | Soliman et al. |
| 5,966,658 A | 10/1999 | Kennedy, III et al. | 6,192,390 B1 | 2/2001 | Berger et al. |
| 5,969,608 A | 10/1999 | Sojdehei et al. | 6,198,390 B1 | 3/2001 | Schlager et al. |
| 5,973,756 A | 10/1999 | Erlin | 6,199,068 B1 | 3/2001 | Carpenter |
| 5,974,236 A | 10/1999 | Sherman | 6,208,266 B1* | 3/2001 | Lyons et al. ............ 340/870.02 |
| 5,978,364 A | 11/1999 | Melnik | 6,215,440 B1 | 4/2001 | Morales |
| 5,978,371 A | 11/1999 | Mason, Jr. et al. | 6,218,953 B1 | 4/2001 | Petite ......................... 340/641 |
| 5,986,574 A | 11/1999 | Colton | 6,218,958 B1 | 4/2001 | Eichstaedt |
| 5,987,421 A | 11/1999 | Chuang | 6,218,983 B1 | 4/2001 | Kerry et al. |
| 5,991,625 A | 11/1999 | Vanderpool | 6,219,409 B1 | 4/2001 | Smith et al. |
| 5,991,639 A | 11/1999 | Rautiola et al. | 6,229,439 B1 | 5/2001 | Tice |
| 5,994,892 A | 11/1999 | Turino et al. | 6,233,327 B1 | 5/2001 | Petite |
| 5,995,592 A | 11/1999 | Shirai et al. | 6,234,111 B1* | 5/2001 | Ulman et al. .................. 119/54 |

| | | |
|---|---|---|
| 6,236,332 B1 | 5/2001 | Conkright et al. |
| 6,243,010 B1 | 6/2001 | Addy et al. |
| 6,246,677 B1 | 6/2001 | Nap et al. |
| 6,246,886 B1 | 6/2001 | Oliva |
| 6,249,516 B1 | 6/2001 | Brownrigg et al. |
| 6,259,369 B1 | 7/2001 | Monico |
| 6,275,707 B1 | 8/2001 | Reed et al. |
| 6,286,756 B1 | 9/2001 | Stinson et al. |
| 6,288,634 B1 | 9/2001 | Weiss et al. |
| 6,288,641 B1 * | 9/2001 | Casais .................. 340/539.26 |
| 6,295,291 B1 | 9/2001 | Larkins |
| 6,301,514 B1 * | 10/2001 | Canada et al. .............. 700/108 |
| 6,304,556 B1 | 10/2001 | Haas |
| 6,305,602 B1 | 10/2001 | Grabowski et al. |
| 6,308,111 B1 | 10/2001 | Koga |
| 6,311,167 B1 | 10/2001 | Davis et al. |
| 6,314,169 B1 | 11/2001 | Schelberg, Jr. et al. |
| 6,317,029 B1 | 11/2001 | Fleeter |
| 6,334,117 B1 | 12/2001 | Covert et al. |
| 6,351,223 B1 | 2/2002 | DeWeerd et al. |
| 6,356,205 B1 | 3/2002 | Salvo et al. |
| 6,357,034 B1 | 3/2002 | Muller et al. |
| 6,362,745 B1 | 3/2002 | Davis |
| 6,363,057 B1 | 3/2002 | Ardalan et al. |
| 6,366,217 B1 | 4/2002 | Cunningham et al. |
| 6,366,622 B1 | 4/2002 | Brown et al. |
| 6,369,769 B1 | 4/2002 | Nap et al. |
| 6,370,489 B1 | 4/2002 | Williams et al. |
| 6,373,399 B1 | 4/2002 | Johnson et al. |
| 6,380,851 B1 | 4/2002 | Gilbert et al. |
| 6,384,722 B1 | 5/2002 | Williams |
| 6,393,341 B1 | 5/2002 | Lawrence et al. |
| 6,393,381 B1 | 5/2002 | Williams et al. |
| 6,393,382 B1 | 5/2002 | Williams et al. |
| 6,396,839 B1 | 5/2002 | Ardalan et al. |
| 6,400,819 B1 | 6/2002 | Nakano et al. |
| 6,401,081 B1 | 6/2002 | Montgomery et al. |
| 6,405,018 B1 | 6/2002 | Reudink et al. |
| 6,411,889 B1 | 6/2002 | Mizunuma et al. |
| 6,415,245 B2 | 7/2002 | Williams et al. |
| 6,421,354 B1 | 7/2002 | Godlewski |
| 6,421,731 B1 | 7/2002 | Ciotti, Jr. et al. |
| 6,422,464 B1 | 7/2002 | Terranova |
| 6,424,270 B1 | 7/2002 | Ali |
| 6,424,931 B1 | 7/2002 | Sigmar et al. |
| 6,430,268 B1 | 8/2002 | Petite |
| 6,431,439 B1 | 8/2002 | Suer et al. |
| 6,437,692 B1 | 8/2002 | Petite et al. |
| 6,438,575 B1 | 8/2002 | Khan et al. |
| 6,445,291 B2 | 9/2002 | Addy et al. |
| 6,456,960 B1 | 9/2002 | Williams et al. |
| 6,457,038 B1 * | 9/2002 | Defosse ...................... 709/200 |
| 6,462,644 B1 | 10/2002 | Howell et al. |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,504,357 B1 | 1/2003 | Hemminger et al. |
| 6,507,794 B1 | 1/2003 | Hubbard et al. |
| 6,509,722 B2 | 1/2003 | Lopata |
| 6,519,568 B1 | 2/2003 | Harvey et al. |
| 6,538,577 B1 | 3/2003 | Ehrke et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 | 5/2003 | Egan et al. |
| 6,574,603 B1 | 6/2003 | Dickson et al. |
| 6,584,080 B1 | 6/2003 | Ganz et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,654,357 B1 | 11/2003 | Wiedeman |
| 6,671,586 B2 | 12/2003 | Davis et al. |
| 6,674,403 B2 | 1/2004 | Gray et al. |
| 6,678,255 B1 | 1/2004 | Kuriyan |
| 6,678,285 B1 | 1/2004 | Garg |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,771,981 B1 | 8/2004 | Zalewski et al. |
| 6,804,532 B1 | 10/2004 | Moon et al. |
| 6,816,088 B1 | 11/2004 | Knoska et al. |
| 6,888,876 B1 | 5/2005 | Mason, Jr. et al. |
| 6,891,838 B1 | 5/2005 | Petite |
| 6,914,533 B2 | 7/2005 | Petite |
| 6,914,893 B2 | 7/2005 | Petite |
| 6,959,550 B2 | 11/2005 | Freeman et al. |
| 7,027,416 B1 | 4/2006 | Kriz |
| 7,054,271 B2 | 5/2006 | Brownrigg et al. |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0013679 A1 | 1/2002 | Petite |
| 2002/1112323 | 1/2002 | Petite |
| 2002/0019725 A1 | 2/2002 | Petite |
| 2002/0027504 A1 | 3/2002 | Petite |
| 2002/0031101 A1 | 3/2002 | Petite |
| 2002/0032746 A1 | 3/2002 | Lazaridis |
| 2002/0061031 A1 | 5/2002 | Sugar et al. |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0136233 A1 | 9/2002 | Chen et al. |
| 2002/0158774 A1 | 10/2002 | Johnson et al. |
| 2002/0163442 A1 | 11/2002 | Fischer |
| 2002/0169643 A1 | 11/2002 | Petite |
| 2002/0193144 A1 | 12/2002 | Belski et al. |
| 2003/0001754 A1 | 1/2003 | Johnson et al. |
| 2003/0023146 A1 | 1/2003 | Shusterman |
| 2003/0028632 A1 | 2/2003 | Davis |
| 2003/0030926 A1 | 2/2003 | Aguren et al. |
| 2003/0034900 A1 | 2/2003 | Han |
| 2003/0035438 A1 | 2/2003 | Larsson |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0073406 A1 | 4/2003 | Benjamin et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0185204 A1 | 10/2003 | Murdock |
| 2003/0210638 A1 | 11/2003 | Yoo et al. |
| 2004/0047324 A1 | 3/2004 | Diener |
| 2004/0053639 A1 | 3/2004 | Petite |
| 2004/0131125 A1 | 7/2004 | Sanderford, Jr. et al. |
| 2004/0133917 A1 | 7/2004 | Schilling |
| 2004/0183687 A1 | 9/2004 | Petite |
| 2004/0228330 A1 | 11/2004 | Kubler et al. |
| 2005/0190055 A1 | 9/2005 | Petite |
| 2005/0195768 A1 | 9/2005 | Petite |
| 2005/0195775 A1 | 9/2005 | Petite |

| | | | |
|---|---|---|---|
| 2005/0201397 | A1 | 9/2005 | Petite |
| 2005/0243867 | A1 | 11/2005 | Petite |
| 2006/0095876 | A1 | 5/2006 | Brownrigg et al. |
| 2008/0186898 | A1 | 8/2008 | Petite |
| 2009/0006617 | A1 | 1/2009 | Petite |
| 2009/0068947 | A1 | 3/2009 | Petite |

FOREIGN PATENT DOCUMENTS

| | | |
|---|---|---|
| EP | 07144 | 2/1998 |
| EP | 1096454 | 5/2001 |
| FR | 2817110 | 5/2002 |
| GB | 2229302 | 9/1990 |
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 01255100 | 10/1989 |
| JP | 11353573 | 12/1999 |
| JP | 200113590 | 4/2000 |
| JP | 2001063425 | 3/2001 |
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 2001025431 | 4/2001 |
| NO | 03/021877 | 3/2003 |
| WO | WO 90/13197 | 11/1990 |
| WO | WO 98/00056 | 1/1998 |
| WO | WO98/10393 A1 | 3/1998 |
| WO | WO 98/37528 | 8/1998 |
| WO | WO 99/13426 | 3/1999 |
| WO | WO00/36812 A1 | 6/2000 |
| WO | WO 01/15114 | 8/2000 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO02/052521 | 7/2002 |
| WO | WO 03/007264 | 1/2003 |
| WO | WO03/007264 | 1/2003 |
| WO | WO 03/021877 | 3/2003 |

OTHER PUBLICATIONS

Westcott, Jil et al., "A Distributed Routing Design For A Broadcoast Environment", IEEE 1982, pp. 10.4.0-10.4.5.
Khan, Robert E. et al., "Advances in Packet Radio Technology", IEEE Nov. 1978, vol. 66, No. 11, pp. 1468-1496.
Frankel, Michael S., "Packet Radios Provide Link for Distributed, Survivable C3 in Post-Attack Scenarios", MSN Jun. 1983.
Lauer, Greg et al., "Survivable Protocols for Large Scale Packet Radio Networks", IEEE 1984, pp. 15.1-1 to 15.1-4.
Gower, Neil et al., "Congestion Control Using Pacing in a Packet Radio Network", IEEE 1982, pp. 23.1-1 to 23.1-6.
MacGregor, William et al., "Multiple Control Stations in Packet Radio Networks", IEEE 1982, pp. 10.3-1 to 10.3-5 1.
Shacham, Nachum et al., "Future Directions in Packet Radio Technology", IEEE 1985, pp. 93-98.
Jubin, John, "Current Packet Radio Network Protocols", IEEE 1985, pp. 86-92.

Westcott, Jill A., Issues in Distributed Routing for Mobile Packet Radio Network, IEEE 1982, pp. 233-238.
Lynch, Clifford A. et al., Packet Radio Networks, "Architectures, Protocols, Technologies and Applications,".
Brownrigg, Edwin, "User Provided Access to the Internet", Open Access Solutions, http://web.simmons.edu/chen/nit/NIT'92/033-bro.htm, Jun. 8, 2005 - Jun. 9, 2005.
Khan, Robert E., "The Organization of Computer Resources into a Packet Radio Network," IEEE, Jan. 1977, vol. Com-25 No. 1, pp. 169-178.
Westcott, Jill A., "Issues in Distributed Routing for Mobile Packet Radio Network," IEEE 1982, pp. 233-238.
Khan, Robert E., "The Organization of Computer Resources into a Packet Radio Network," IEEE Transactions on Communications, Jan. 1977, vol. Com-25 No. 1, pp. 169-178.
Westcott, Jill A., "Issues in Distributed Routing for Mobile Packet Radio Network," IEEE 1982, pp. 233-238.
Brownrigg, E.B. et al.; A Packet Radio Network for Library Automation; IEEE (1987); pp. 456-462.
Brownrigg, E.B., et al.; A Packet Radio Networks; Architectures, Protocols, Technologies and Applications (1987), (introduction pp. ix-xviii); pp. 3-274.
Brownrigg, E.B., et al.; Distributions, Networks, and Networking: Options for Dissemination; Workshop on Electronic Texts Session III (http://palimpsest.standford.edu/byorg/lc/etextw/sess3.html 1992): pp. 1-10.
Brownrigg, E.B. et al.; User Provided Access to the Internet; (http://web.simmons.edu/~chen/nit/NIT'92/033-bro.htm 2005) pp. 1-6.
Wey, Jyhi-Kong et al.; Clone Terminator: An Authentication Service for Advanced Mobile Phone System; IEEE (1995); pp. 175-179.
Davis, A.B. et al.; Knowledge-Based Management of Cellular Clone Fraud; IEEE (1992); pp. 230-234.
Johnson, David B.; Routing in Ad Hoc Networks of Mobile Hosts; IEEE (1995); pp. 158-163.
Jubin, John and Tornow, Janet D., "The Darpa Packet Radio Network Protocols," Proceedings of the IEEE, vol. 75, No. 1, Jan. 1987, pp. 21-32.
Kleinrock, Leonard and Kamoun, Farouk, "Hierarchical Routing for Large Networks," North-Holland Publishing Company, Computer Networks 1, 1997, pp. 155-174.
Perkins, C.E. et al.; Highly Dynamic Destination-Sequenced Distance-Vector Routing (DSDV) for Mobile Computers; SIGCOMM 94-9/94 London England UK (1994); pp. 234-244.
Wu, J.; Distributed System Design; CRC Press (1999); pp. 177-180 and 204.
Khan, Robert E., Gronemeyer, Steven A. Burchfiel, Jerry, and Kunzelman, Ronald C., "Advances in Packet Radio Technology" IEEE Nov. 1978, vol. 66, No. 11, pp. 1468-149.
Babak Daneshrad, et al.; 1997 Project Summary "Mobile Versatile Radios (MoVeR);" University of California, Los Angeles; pp. 1-4.
Rajeev Jain, et al.; 1997 Project Summary "Held Untethered Nodes;" University of California, Los Angeles; pp. 1-5.
Randy H. Katz and Eric A. Brewer; 1997 Project Summary "Towards a Wireless Overlay Internetworking Architecture;" University of California, Berkeley; pp. 1-8, including slide show presentation at http://daedalus.cs.berkeley,edu/talks/retreat.6.96/Overview.pdf.
J.J. Garcia-Luna-Aceves, et al.; "Wireless Internet Gateways (Wings)," IEEE, 1997; pp. 1271-1276.

Randy H. Katz, et al.; "The Bay Area Research Wireless Access Network (BARWAN);" Electrical Engeneering and Computer Science Department, University of California, Berkeley, CA; IEEE, 1996; pp. 15-20, including slide show presentation at http://daedalus.cs.berkeley.edu/talks/retreat.6.97/BARWAN.S97.ppt.

USPO's Decision dated Nov. 28, 2008 Denying Ex Parte Reexamination of USPN 7,103,511 in U.S. Appl. No. 90/010,315.

USPTO's Decision dated Jun. 22, 2009 Granting Ex Parte Reexamination of USPN 7,103,511 in U.S. Appl. No. 90/010,509.

USPTO's Decision dated Jun. 22, 2009 Granting Ex Parte Reexamination of USPN 7,103,511 in U.S. Appl. No. 90/010,505.

USPTO's Decision dated Jun. 22, 2009 Granting Ex Parte Reexamination of USPN 7,103,511 in U.S. Appl. No. 90/010,507.

USPTO's Decision dated Jun. 22, 2009 Granting Ex Parte Reexamination of USPN 7,103,511 in U.S. Appl. No. 90/010,508.

USPTO's Decision dated Jul. 21, 2009 Granting Ex Parte Reexamination of USPN 6,891,838 in U.S. Appl. No. 90/010,512.

USPTO's Decision dated Jul. 21, 2009 Granting Ex Parte Reexamination of USPN 6,891,838 in U.S. Appl. No. 90/010,510.

USPTO's Decision dated Jul. 21, 2009 Granting Ex Parte Reexamination of USPN 6,891,838 in U.S. Appl. No. 90/010,511.

USPTO's Decision dated Nov. 13, 2008 Granting Ex Parte Reexamination of USPN 6,891,838 in U.S. Appl. No. 90/010,301.

K. Bult, et al.; "Low Power Systems for Wireless Microsensors;" UCLA Electrical Engineering Department, Los Angeles, CA and Rockwell Science Center, Thousand Oaks, CA; pp. 25-29.

David B. Johnnson and David A. Maltz, Dynamic Source Routing in Ad Hoc Wireless Networks; Computer Science Department, Carnegie Mellon University; a chapter in Mobile Computing; Feb. 29, 1996; pp. 1-18.

David A. Maltz et al.; Experiences Designing and Building a Multi-Hop Wireless Ad Hoc Network Testbed; School of Computer Science, Carnegie Mellon University; Mar. 5, 1999; pp. 1-20.

"Part 11: Wireless LAN Medium Access Control (MAC) and Physical Layer (PHY) Specifications;" IEEE Std 802.11-1997; published Jun. 26, 1997 by the IEEE; pp. 1-459.

John Jubin and Janet D. Tornow; "The DARPA Packet Radio Network Protocols;" Proceedings of the IEEE; vol. 75, No. 1, Jan. 1987; pp. 64-79.

Chane Lee Fullmer; "Collision Avoidance Techniques for Packet-Radio Networks" thesis; University of California at Santa Cruz, CA; Jun. 1998; pp. 1-172.

* cited by examiner

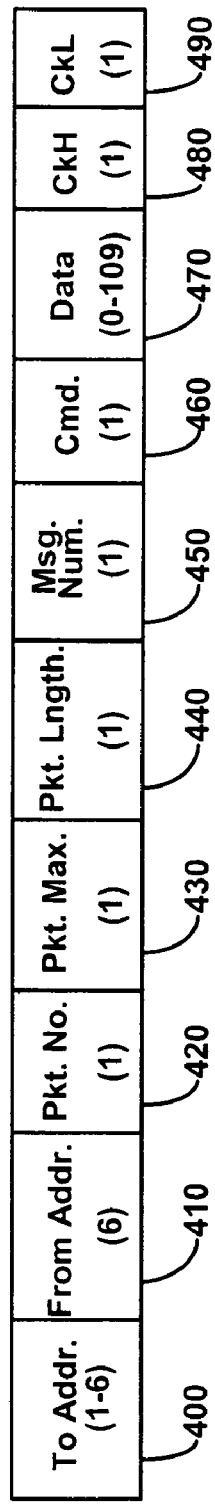
FIG. 4  Message Structure

| "To Address" | Byte Assignment: |
|---|---|
| MSB - Byte 1<br>Device Type | FF-F0 (16) - Broadcast All Devices (1 Byte Address)<br>EF-1F (224) - Device Type Base (2 to 6 Byte Address)<br>0F-00 (16) - Personal Transceiver Identification (6 Byte Address) |
| Byte 2<br>Mfg./Owner<br>ID | FF-F0 (16) - Broadcast all Devices (Byte 1 Type)<br>(2 Byte Broadcast Address)<br>EF-00 (240) - Mfg./Owner Code Identification Number |
| Byte 3<br>Mfg./Owner<br>Extension ID | FF-F0 (16) - Broadcast all Devices (Byte 1 & Byte 2 Type)<br>(3 Byte Broadcast Address)<br>EF-00 (240) - Device Type/Mfg./Owner Code ID Number |
| Byte 4 | FF-F0 (16) - Broadcast all Devices (Byte 1 & Byte 2 Type)<br>(4 Byte Broadcast Address)<br>EF-00 (240) - ID Number |
| Byte 5 | (FF-00) 256 - Identification Number |
| Byte 6 | (FF-00) 256 - Identification Number |

FIG. 5

Sample Messages

Central Server to Personal Transceiver - Broadcast Message - FF (Emergency)

Byte Count = 12

600

| To Addr. (FF) | From Addr. (12345678) | Pkt. No. (00) | Pkt. Max. (00) | Pkt. Lngth. (0C) | Cmd. (FF) | CkH (02) | CkL (9E) |
|---|---|---|---|---|---|---|---|

---

First Transceiver to Repeater (Transceiver)
Broadcast Message - FF (Emergency)

Byte Count = 17

602

| To Addr. (F0) | From Addr. (12345678) | Pkt. No. (00) | Pkt. Max. (00) | Pkt. Lngth. (11) | Cmd. (FF) | Data (A000123456) | CkH (03) | CkL (A0) |
|---|---|---|---|---|---|---|---|---|

Note: Additional Transceiver Re-Broadcasts do not change the message.
The messages are simply received and re-broadcast.

---

Message to Device "A0" From Device "E1" Command - "08" (Respond to PING)
Response will reverse "To" and "From" Addresses Byte Count = 17

604

| To Addr. (A012345678) | From Addr. (E112345678) | P # (00) | P Max. (00) | P Lngth. (11) | Cmd. (08) | Data (A5) | CkH (04) | CkL (67) |
|---|---|---|---|---|---|---|---|---|

FIG. 6

SYSTEM AND METHOD FOR CONTROLLING COMMUNICATION BETWEEN A HOST COMPUTER AND COMMUNICATION DEVICES ASSOCIATED WITH REMOTE DEVICES IN AN AUTOMATED MONITORING SYSTEM

CROSS-REFERENCE TO RELATED APPLICATIONS

This application is a continuation-in-part of the following U.S. utility patent applications: U.S. patent application Ser. No. 09/271,517, filed Mar. 18, 1999, and entitled, "System For Monitoring Conditions in a Residential Living Community,", now abandoned; U.S. patent application Ser. No. 09/439,059, filed Nov. 12, 1999, and entitled, "System and Method for Monitoring and Controlling Remote Devices", now U.S. Pat. No. 6,437,692, issued Aug. 20, 2002; U.S. patent application Ser. No. 09/812,809, filed Mar. 20, 2001, and entitled, "System and Method for Monitoring the Light Level in a Lighted Area", now abandoned, which is a continuation-in-part of U.S. patent application Ser. No. 09/412,895, filed Oct. 5, 1999, and entitled, "System For Monitoring the Light Level Around and ATM," now U.S. Pat. No. 6,218,953, issued Apr. 17, 2001. Each of the identified U.S. patent applications is incorporated herein by reference in its entirety. This application also claims the benefit of U.S. Provisional Application Ser. No. 60/223,943, filed Aug. 9, 2000, and entitled "Design Specifications for a Site Controller" which is hereby incorporated by reference in its entirety.

FIELD OF THE INVENTION

The present invention generally relates to systems for monitoring and/or controlling a plurality of remote devices via a host computer connected to a wide area network (WAN), and more particularly relates to systems and methods for managing communication between the host computer and the plurality of remote devices.

BACKGROUND OF THE INVENTION

There are a variety of systems for monitoring and/or controlling any of a number of systems and/or processes, such as, for example, manufacturing processes, inventory systems, emergency control systems, personal security systems, residential systems, and electric utility meters to name a few. In many of these "automated monitoring systems," a host computer in communication with a wide area network monitors and/or controls a plurality of remote devices arranged within a geographical region. The plurality of remote devices typically use remote sensors and controllers to monitor and respond to various system parameters to reach desired results. A number of automated monitoring systems use computers or dedicated microprocessors in association with appropriate software to process system inputs, model system responses, and control actuators to implement corrections within a system.

Various schemes have been proposed to facilitate communication between the host computer and the remote devices within the system, including RF transmission, light transmission (including infra-red), and control signal modulation over the local power distribution network. For example, U.S. Pat. No. 4,697,166 to Warnagiris et al. describes a power-line carrier backbone for inter-element communications. As recognized in U.S. Pat. No. 5,471,190 to Zimmerman, there is a growing interest in home automation systems and products that facilitate such systems. One system, critically described in the Zimmerman patent, is the X-10 system. Recognizing that consumers will soon demand interoperability between household systems, appliances, and computing devices, the Electronics Industry Association (EIA) has adopted an industry standard, known as the Consumer Electronics Bus (CEBus). The CEBus is designed to provide reliable communications between suitably configured residential devices through a multi-transmission media approach within a single residence.

One problem with expanding the use of control systems technology to distributed systems is the cost associated with developing the local sensor-actuator infrastructure necessary to interconnect the various devices. A typical approach to implementing control system technology is to install a local network of hard-wired sensors and actuators along with a local controller. Not only is there expense associated with developing and installing appropriate sensors and actuators, but the added expense of connecting functional sensors and actuators with the local controller is also problematic. Another prohibitive cost is the expense associated with the installation and operational expense associated with programming the local controller.

Accordingly, an alternative solution for implementing a distributed control system suitable for monitoring and controlling remote devices that overcomes the shortcomings of the prior art is desired.

SUMMARY OF THE INVENTION

To achieve the advantages and novel features, an embodiment of the present invention is generally directed to a cost-effective automated monitoring system and method for monitoring and controlling a plurality of remote devices via a host computer connected to a communication network, such as a wide area network. The automated monitoring system may include one or more sensors to be read and/or actuators to be controlled, ultimately, through a remote applications server via a site controller. The remote applications server and the site controller may communicate via a communication network, such as a wide area network. The sensors and/or actuators are in communication with communication devices, which may be wireless, that transmit and/or receive encoded data and control signals to and from the site controller. Additional communication devices, such as wireless repeaters, may relay information between communication devices disposed in connection with the sensors and/or actuators and the site controller.

More specifically, the present invention is directed to a site controller adapted to be used in an automated monitoring system for monitoring and controlling a plurality of remote devices via a host computer connected to a first communication network. The site controller is configured for controlling communication with the host computer and a plurality of communication devices that define a second communication network associated with the plurality of remote devices. Briefly described, in one embodiment, the site controller comprises a transceiver configured to communicate with the plurality of communication devices via the second communication network; a network interface device configured to communicate with the host computer via the first communication network; and logic configured to: manage communication with each of the plurality of communication devices, via a first communication protocol, based on one or more communication paths for each of the plurality of communication devices, each communication path comprising one or more communication devices involved in the communication link between the transceiver and each of the plurality of communication devices; and manage communication with the host computer via a second communication protocol.

The present invention may also be viewed as providing a method for controlling communication with a host computer connected to a first communication network and a plurality of communication devices that define a second communication network associated with a plurality of remote devices that are to be monitored and controlled by the host computer. Briefly, one such method involves the steps of: determining a unique address for each of the plurality of communication devices by receiving an initialization message; determining with which of the plurality of communications devices that each of the plurality of communication devices has a communication link; based on the plurality of unique addresses and which of the plurality of communications devices each of the plurality of communication devices has a communication link with, determining one or more communication paths associated with each of the plurality of communication devices; managing communication with each of the plurality of communication devices, via a first communication protocol, based on one or more of the communication paths associated with each of the plurality of communication devices; and managing communication with the host computer via a second communication protocol.

Thus, the site controller according to the present invention minimizes cost and complexity by providing a site controller to maintain the bulk of the data needed by the user and by providing simplified and inexpensive communication devices to collect and communicate the data to the site controller. By simplifying the communication devices and maintaining data storage, data organization, etc., at the site controller, initial installation costs are reduced, and future expansions of the automated monitoring system are simple and inexpensive.

BRIEF DESCRIPTION OF THE DRAWINGS

The accompanying drawings incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views.

FIG. 4 is a table illustrating an embodiment of a message structure for a communication protocol according to the present invention that may be used for communicating between the site controller and transceivers of FIG. 1.

FIG. 5 is a table illustrating various values for the "to address" in the message structure of FIG. 4.

FIG. 6 illustrates three sample messages for the message structure of FIG. 4 according to the present invention.

DETAILED DESCRIPTION OF THE PREFERRED EMBODIMENTS

Figure 1:
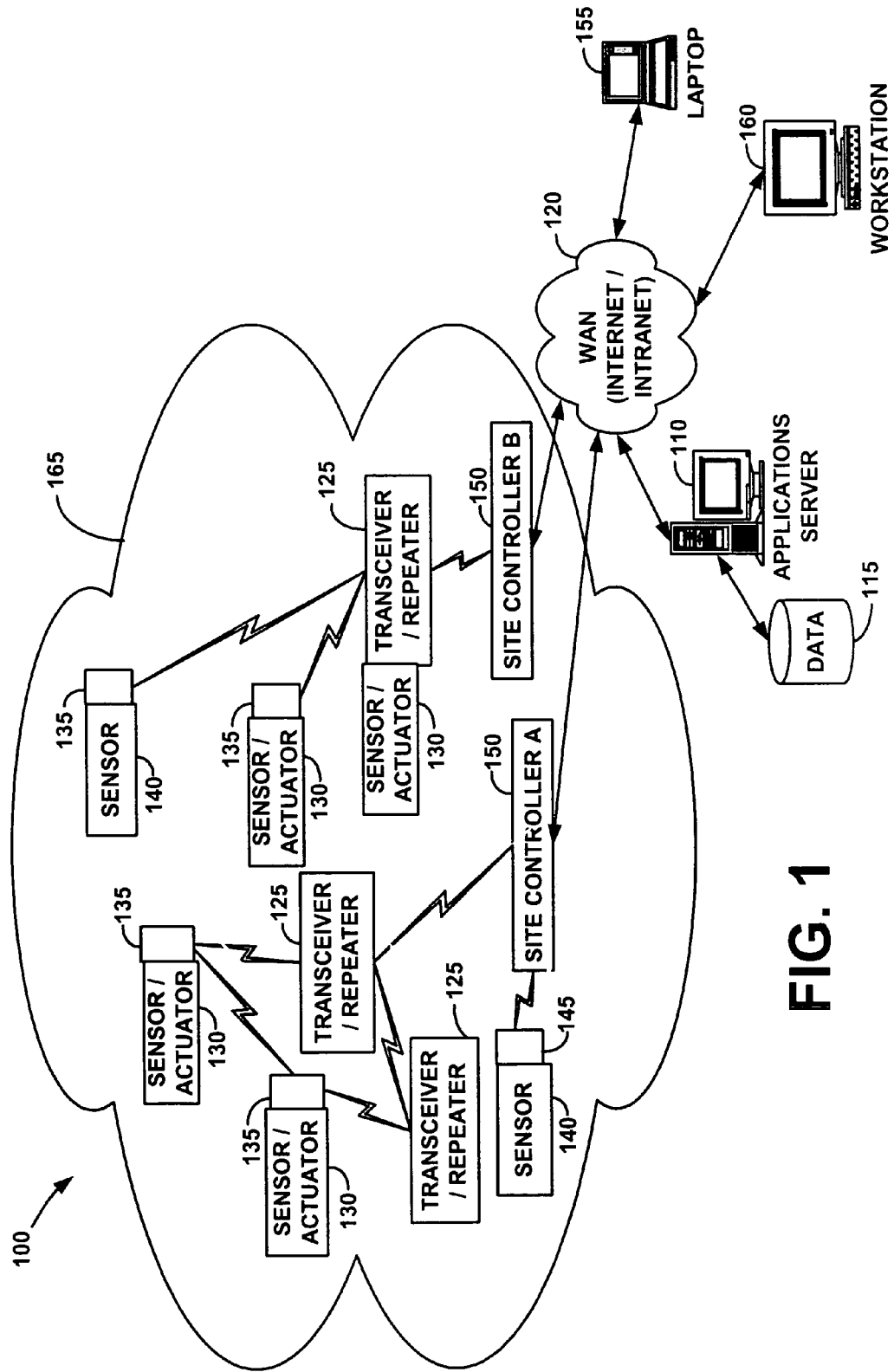
FIG. 1 is a block diagram illustrating an embodiment of an automated monitoring system according to the present invention.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

FIG. 1 is a block diagram illustrating one of a number of possible embodiments of an automated monitoring system 100 according to the present invention. Automated monitoring system 100 may comprise one or more applications servers 110, a database 115, a wide area network (WAN) 120, transceivers/repeaters 125, sensor/actuators 130, transceivers 135, sensors 140, transmitters 145, and at least one site controller 150. Each of the sensor/actuators 130 and sensors 140 is integrated with a suitably configured wireless transceiver/repeater 125, a wireless transceiver 135, or wireless transmitter 145 Within the context of this document, a wireless transceiver/repeater 125, a wireless transceiver 135, and a wireless transmitter 145 will be referred to as "wireless communication devices."

Each of the wireless communication devices in automated monitoring system 100 is preferably small in size and may be configured to transmit a relatively low-power signal, such as, for example a radio frequency (RF) signal. As a result, in some applications, the transmission range of a given RF communication device may be relatively limited. Of course, the transmitter power and range may be appropriately designed for the target operating environment. As will be appreciated from the description that follows, this relatively limited transmission range of the wireless communication devices is advantageous and a desirable characteristic of automated monitoring system 100. Although the wireless communication devices are depicted without a user interface such as a keypad, etc., in certain embodiments the wireless communication devices may be configured with user selectable push-buttons, switches, an alphanumeric keypad, or any other type of user interface device suitably configured with software and/or firmware to accept operator input. Often the wireless communication device will be in communication with a sensor 140 or with a sensor/actuator 130, such as a smoke detector, a thermostat, a security system. etc., where user selectable inputs may not be needed.

As illustrated in FIG. 1, the wireless communication devices in automated monitoring system 100 are geographically arranged such that the antenna patterns (not shown) associated with each wireless communication device overlap to create a coverage area 165. In this manner, automated monitoring system 100 may enable a site controller 150 associated with coverage area 165 to communicate with each sensor/actuator 130 and each sensor 140 via any of a plurality of possible communication paths. For instance, site controller 150 may communicate with a specific sensor/actuator 130 via a plurality of distinct communication paths, each of which are defined by one or more wireless communication devices involved in the communication between site controller 150 and the specific sensor/actuator 130. By way of example, one of the plurality of possible communication paths may consist of a wireless connection from site controller 150 to a wireless communication device associated with the specific sensor/actuator 130. Another possible communication path may consist of a wireless connection from site controller 150 to an intermediate wireless communication device and then to the wireless communication device associated with the specific sensor/actuator 130. Further communication paths may include multiple intermediate wireless communication devices in the wireless connection between site controller 150 and the wireless communication device associated with the specific sensor/actuator 130.

As illustrated in FIG. 1, one or more sensors 140 may communicate with at least one site controller 150 via a wireless transmitter 145, a wireless transceiver 135, or a wireless transceiver/repeater 125. Furthermore, one or more sensors/actuators 130 may communicate with at least one site controller 150 via a wireless transceiver 135 or a wireless transceiver/repeater 125. One of ordinary skill in the art will appreciate that in order to send a command from the applications server 110 to a sensor/actuator 130, the wireless communication device associated with the sensors/actuators 130 should be a two-way communication device, such as a transceiver. It will also be appreciated that one or more sensors/actuators 130 may be in direct communication with one or more site controllers 150. It will be further appreciated that the communication medium between the one or more sensor/actuators 130 and the one or more site controller 150 may be wireless or, for relatively closely located configurations, a wired communication medium may be used.

As is further illustrated in FIG. 1, automated monitoring system 100 may comprise a plurality of stand-alone wireless transceiver/repeaters 125. Each stand-alone wireless transceiver/repeater 125, as well as each wireless transceiver 135, may be configured to receive one or more incoming transmissions (transmitted by a remote transmitter 145 or transceiver 135) and to transmit an outgoing signal. This outgoing signal may be any wireless transmission signal, such as, for example, a low-power RF transmission signal, or a higher-power RF transmission signal. Alternatively, where a wired configuration is employed, the outgoing signal may be transmitted over a conductive wire, fiber optic cable, or other transmission media. One of ordinary skill in the art will appreciate that if an integrated wireless communication device (e.g., a wireless transmitter 145, a wireless transceiver 135, or a wireless transceiver/repeater 125) is located sufficiently close to site controller 150 such that its output signal can be received by at least one site controller 150, the data transmission signal need not be processed and repeated through either a wireless transceiver/repeater 125 or wireless transceivers 135.

One or more site controllers 150 are configured and disposed to receive remote data transmissions from the various stand-alone wireless transceiver/repeaters 125, integrated wireless transmitters 145, or the integrated wireless transceivers 135. The site controllers 150 may be configured to analyze the transmissions received, convert the transmissions into TCP/IP format, and further communicate the remote data signal transmissions via WAN 120 to one or more applications servers 110 or other devices in communication with WAN 120. One of ordinary skill in the art will appreciate that additional site controllers 150 may function as either a backup site controller in the event of a site controller failure or can function as a primary site controller to expand the potential size of coverage area 165 of automated monitoring system 100. When implemented as a back-up site controller 150, the second site controller 150 may function when the applications server 110 detects a site controller failure. Alternatively, the second site controller 150 may function to expand the capacity of automated monitoring system 100. A single site controller 150 may accommodate a predetermined number of wireless communication devices. While the number of wireless communication devices may vary based upon individual requirements, in one of a number of embodiments there may be approximately 500 wireless communication devices.

By way of example, a second site controller 150 may double the capacity of a single system. Although not shown, additional site controllers 150 may be added depending on the specific implementation of automated monitoring system 100. The number of wireless communication devices managed by a site controller 150 is limited only by technical constraints such as memory, storage space, etc. In addition, the site controller 150 may manage more addresses than devices as some wireless communication devices may have multiple functions such as sensing, repeating, etc. As stated above, automated monitoring system 100 includes an applications server 110 in communication with site controller 150 via WAN 120. Applications server 110 may host any of a variety of application specific software depending on the precise environment in which automated monitoring system 100 is employed. As further described below, the site controller 150 may receive, via WAN 120, information in the form of data and/or control signals from applications server 110, laptop computer 155, workstation 160, and any other device in communication with WAN 120 Site controller 150 may then communicate the data and/or control signals to remote sensor/actuators 130 and/or remote sensors 140. Automated monitoring system 100 may also comprise a database 115 associated with applications server 110. Database 115 may be configured to communicate with applications server 110 and record client specific data or to assist the applications server 110 in deciphering a particular data transmission from a particular sensor 140.

Figure 2:
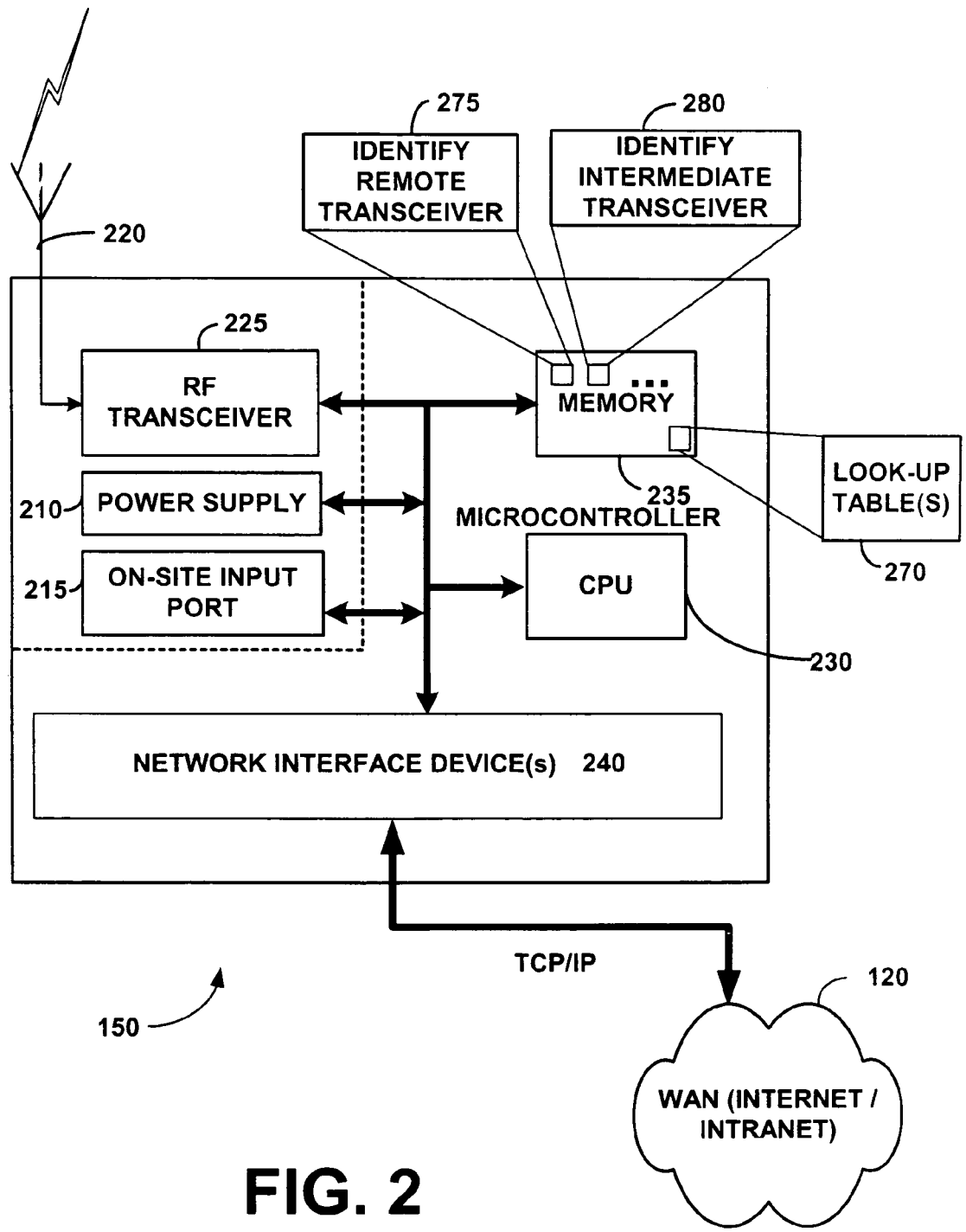
FIG. 2 is a block diagram illustrating an embodiment of the site controller of the automated monitoring system of FIG. 1.

FIG. 2 sets forth one of many possible embodiments of the site controller 150 of FIG. 1. Site controller 150 may comprise a micro-controller 205, a power supply 210, an on-site input port 215, an antenna 220, and a transceiver 225. One of ordinary skill in the art will appreciate that various other elements may be included based on any of a variety of design needs. The micro-controller 205 may comprise a central processing unit (CPU) 230, memory 235, and one or more network interface devices 240. The CPU 230 may be any of a variety of known controllers, such as, for example, a microprocessor, hard-wired circuitry, firmware, etc. The memory 235 may store any necessary programming code for the CPU 230, as well as one or more look-up tables 270, databases (not shown), etc. Network interface devices 240 may be any of a variety of devices configured for communication with WAN 120. For example, site controller 150 may include a network card configured for communication across a local area network to a network server. The network server may contain a backup site controller (not shown) coupled to WAN 120 (FIG. 1). Alternatively, site controller 150 may include a digital subscriber line (DSL) modem 250 configured to provide a link to a remote computing system. In yet another alternative, site controller 150 may include an integrated services digital network (ISDN) card configured for communication via an ISDN connection with a remote system. Other network interfaces may be provided to serve as primary and/or backup links to WAN 120 (FIG. 1) or to local area networks (not shown) that might serve to permit local monitoring of the operating status of site controller 150 and for data packet control.

Depending upon the specific configuration of network interface device(s) 240, site controller 150 may communicate with any of a variety of types of wide area networks. For example, WAN 120 may be any type of communication network, or collection of communication networks, employing any network topology, transmission medium, or network protocol. WAN 120 may be any public or private packet-switched or other data network, including the Internet, circuit-switched networks, such as the public switched telephone network (PSTN), wireless networks, or any other desired communications infrastructure. One of ordinary skill in the art will appreciate that the information transmitted between the wireless communication and site controller 150 may be further integrated with various other data transmission protocols for transmission across telecommunications and computer networks other than the WAN 120 (FIG. 1). In addition, it should be further appreciated that communication networks other than WAN 120 (FIG. 1) may function as the transmission path between the wireless communication devices, site controller 150, and the applications server 110 (FIG. 1).

Referring again to FIG. 2, wireless transceiver 225 may be configured to receive incoming transmissions via antenna 220. Each of the incoming transmissions may be consistently formatted in the message protocol as described below. Site controller 150 may be configured such that the memory 235 includes a look-up table 270 configured for identifying the various wireless communication devices (including intermediate wireless communication devices) used in generating and transmitting the received data transmission. As illustrated in FIG. 2, site controller 150 may include an "Identify Remote Transceiver" memory sector 275 and an "Identify Intermediate Transceiver" memory sector 280. Programmed or recognized codes within the memory 235 may also be provided and configured for controlling the operation of a CPU 230 to carry out the various functions that are orchestrated and/or controlled by the site controller 150. For example, memory 235 may include program code for controlling the operation of the CPU 230 to evaluate an incoming data packet to determine what action needs to be taken. In this regard, one or more look-up tables 270 may also be stored within the memory 235 to assist in this process. Function codes and wireless communication device identifiers transmitter may all be stored with associated information within look-up tables 270.

Thus, one look-up table 270 may be provided to associate identification information for each wireless communication device with a particular user. Another look-up table 270 may be used to identify the various function codes associated with the message protocol. For example, a look-up table 270 may include a unique code designating various functions such as test, temperature, smoke alarm active, security system breach, etc. One of ordinary skill in the art will appreciate that various function codes may be implemented depending on the specific implementation of automated monitoring system 100. In connection with lookup table(s) 270, memory 235 may also include one or more code segments that are executed by the CPU 230 and configured to control operation of the site controller 150. For example, a first data packet segment may be configured for accessing a first lookup table to determine the identity of the wireless communication device that transmitted the received message to the site controller 150. A second code segment may be configured for accessing a second look-up table to determine the proximate location of the wireless communication device that generated the received message. A third code segment may be provided to identify the content of the message transmitted (not shown). Namely, is it a fire alarm, a security alarm, an emergency request by a person, a temperature control setting, etc. In accordance with the present invention, additional, fewer, or different code segments may be provided to carry out various functional operations and data signal transfers.

The power supply 210 may be one of the following: AC power supply, AC power supply with rechargeable battery as a back up solar cells, battery, etc. The power supply provides appropriate DC voltage levels to microcontroller 230. The AC power supply may operate from an external, commonly-provided outside AC power line. The battery may be a lead acid gel battery or other appropriate battery for the prevailing environmental and other conditions that could be considered by those of ordinary skill in the art. The battery may maintain the site controller 150 fully operational for a predetermined time period. This time period may be varied based upon the individual site and system criteria as would be obvious to one of ordinary skill in the art. The battery may also be supplied with a recharger that can recharge the battery to full capacity within a predetermined time period. The charging time may be varied based upon individual site and system criteria as would be obvious to one of ordinary skill in the art. The microcontroller 230 may monitor the battery on a periodic basis and report the battery condition to the applications server 110.

In addition, the power supply 210 may accommodate AC voltages between approximately 95–135 V. It would be obvious to one of ordinary skill in the art to modify this supplied voltage range depending upon individual designs. For example, the supplied voltage range may be varied to accommodate any of a variety of standard supply voltages. Furthermore, the power supply 210 may maintain the temperature of site controller 150 within an acceptable working range, such as approximately 5° C. above the ambient temperature. The operating temperature of the site controller 150 depends upon individual system and environmental conditions. Therefore, it would be obvious to one of ordinary skill in the art to maintain the system at an appropriate operating temperature. This can be accomplished by distributing and/or removing the heat from the power supply 210, adding a heater or various cooling devices, etc. as known by one of ordinary skill in the art.

The on-site input port 215 may be configured to enable an on-site technician to communicate with the microcontroller 230. By way of example, the on-site input port 215 may be a serial port, a USB port, etc. as would be known to one of ordinary skill in the art. The technician may communicate with the on-site input port 215 via any of a variety of computing devices, such as a laptop, personal digital assistant (PDA), or any other computing device. The on-site input port 215 may be used for initial programming updates and other functions as necessary. In addition to on-site programming via the on-site input port 215, the site controller 150 may be reprogrammed via the applications server 110 (FIG. 1).

The transceiver 225 may be a TR1000 hybrid transceiver, which is well-suited for short range, wireless data applications where robust operation, small size, low power consumption, and low-cost are desired. All of the critical wireless functions may be contained within the single hybrid chip to simplify circuit design and accelerate the design process. The receiver section of the TR1000 may preferably be sensitive and stable. A wide dynamic range log detector may be employed, in combination with digital automatic gain control (AGC) to provide robust performance in the presence of channel noise or interference. Two stages of surface acoustic wave (SAW) filtering may provide excellent receiver out-of-band rejection. The transmitter may be configured for both on-off keyed (OOK) and amplitude-shift key (ASK) modulation. The transmitter may be configured for employing SAW filtering to suppress output harmonics in compliance with FCC and other regulations. One of ordinary skill in the art will appreciate that transceiver 225 may be configured in a variety of ways. For example, transceiver 225 may include other 900 MHz transceivers, as well as transceivers at other frequencies. In addition, infrared, ultrasonic, and other types of transceivers may be employed, consistent with the scope of the present invention.

The antenna 220 radiates the signal transmitted by the transceiver 225 to the various wireless communication devices located within coverage area 165. A specific antenna type may be selected based on the frequency at which the signal is to be transmitted. In addition, the antenna 220 may be adjustably oriented as required to maximize both transmission and signal characteristics. Non-limiting examples of antenna types that may be used by the site controller 150 include dipoles, spiral, logarithmic, etc.

The site controller 150 may also be equipped to operate in a wide range of temperatures and humidity levels to provide a consistently operating system. In addition, the site controller 150 may be protected from static discharges and direct contact discharges, such as lightening strikes. To provide consistent operation, the site controller 150 may be shielded to avoid interference from a wide range of electric field and AC line noise.

Significantly, the site controller 150 may communicate with all of the wireless communication devices. Of further significance, the data monitoring and control devices need not be disposed in a permanent location as long as they remain within signal range of a repeating wireless communication device that is within signal range of a site controller 150 that is interconnected through one or more communication networks to the applications server 110. Of still further significance, the automated monitoring system 100, as illustrated in FIG. 1, provides a flexible access and control solution through virtually any suitably configured computing device in communication with the WAN 120. By way of example, a laptop computer 155 and/or a computer workstation 160 appropriately configured with suitable software may provide remote operator access to data collected via automated monitoring system 100. In more robust embodiments, the laptop computer 155 and the computer workstation 160 may permit a user to enter remote operative commands.

In one embodiment of automated monitoring system 100, an applications server 110 (FIG. 1) collects, formats, and stores client specific data from each of the integrated wireless transmitters 145, wireless transceivers 135, and/or wireless transceiver/repeaters 125 for later retrieval and/or access from, for example, workstation 160 or laptop 155. Workstation 160 or laptop 155 may be used to access the stored information in a variety of ways, such as via a web browser. In another embodiment, the applications server 110 may host application specific functions associated with automated monitoring system 100, thereby replacing site controller 150 by generating required control signals for appropriate distribution via the WAN 120 and the site controller 150 to the sensor/actuators 130 and the sensors 140. In a further embodiment, clients may elect, for proprietary reasons, to host control applications on their own workstation 160 that is connected to WAN 120. In this manner, database 115 and applications server 110 may function solely as data collection and reporting devices with the client workstation 160 generating control signals for the system.

Figure 3:
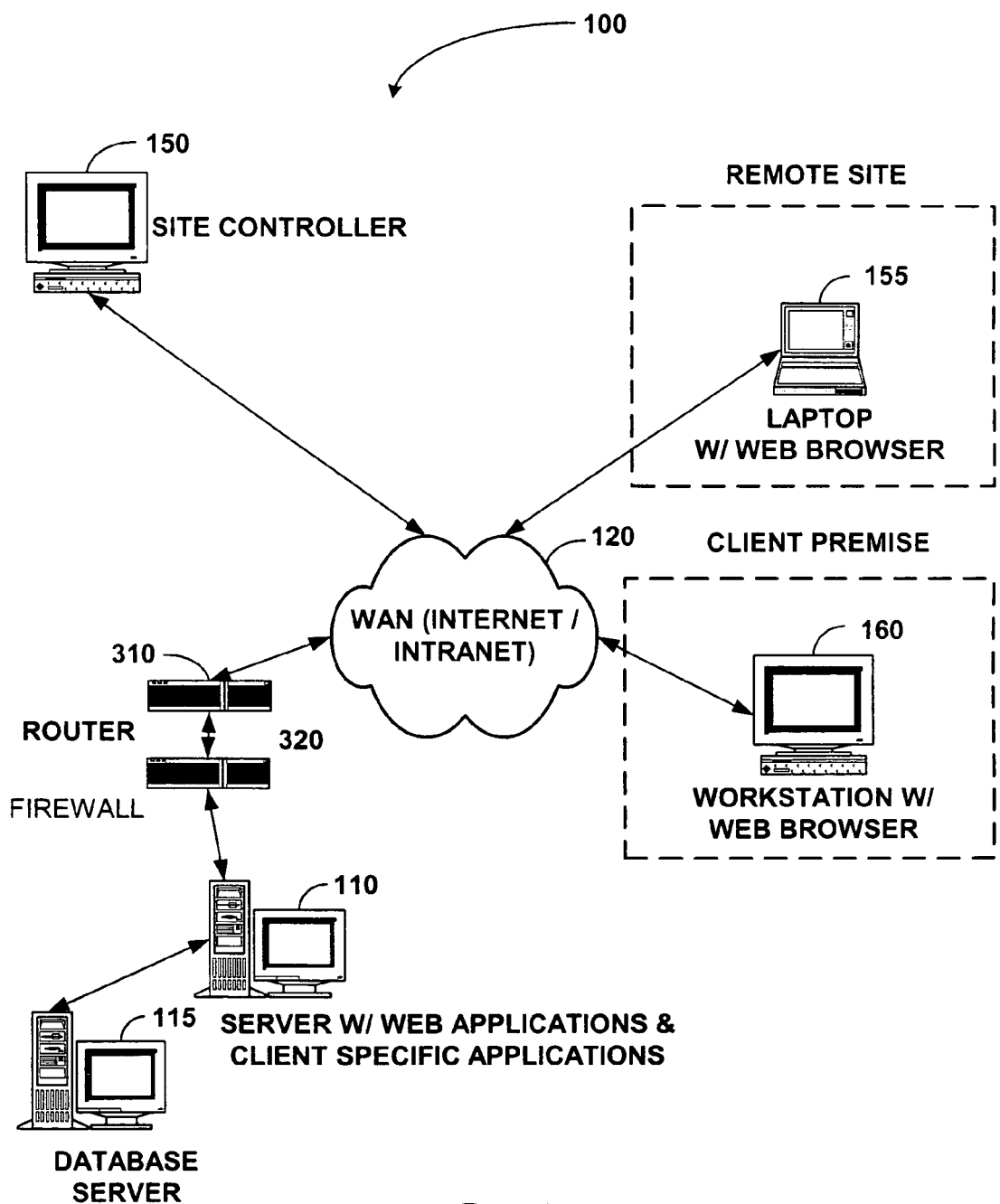
FIG. 3 is a more detailed schematic diagram illustrating the connectivity of the WAN of FIG. 1.

Reference is now made to FIG. 3, which illustrates the external connectivity of WAN 120 of FIG. 1 in accordance with the present invention. Site controller 150 may be configured to transmit control signals and receive data signals using the open data packet protocol described in detail below. Site controller 150 is preferably interconnected permanently on WAN 120 and configured to receive data signals from the wireless communication devices and translate the data signals for transfer to applications servers 110 via WAN 120. Site controller 150 may translate the received data signals into any appropriate protocol for delivery via WAN 120. For example, in one embodiment site controller 150 translates the received data signals into transmission control protocol/Internet protocol (TCP/IP) for delivery via WAN 120. As stated above, applications server 110 may be configured for communication with WAN 120 via, for example, router 310 and further protected and buffered by firewall 320. Applications server 110 may also be configured with web applications and client specific applications as needed for operation of automated monitoring system 100. Consistent with the concepts and teachings of the present invention, applications server 110 may be assisted in its task of storing and making available client specific data by database 115.

As further illustrated in FIG. 3, a client workstation 160 may include a Web browser for facilitating communication with applications server 110, database 115, and/or site controller 150. Alternatively, clients may access WAN 120 via a remote laptop 155 or other computing devices (not shown) configured with a compatible Web browser or other user interface. In this way, the applications server 110 may provide client specific data upon demand.

As stated above, communication between site controller 150 and sensors/actuators 130 and sensors 140 is accomplished using an open data packet protocol in accordance with the present invention. Because the wireless communication devices are geographically arranged such that their respective antenna patterns overlap to create a coverage area 165, site controller 150 may communicate with each sensor/actuator 130 and each sensor 140 via any of a plurality of possible communication paths. Each of the communication paths are defined by one or more wireless communication devices involved in the communication between site controller 150 and the target sensor/actuator 130 and/or sensor 140. For instance, site controller 150 may communicate with a specific sensor/actuator 130 via a plurality of distinct communication paths. By way of example, one of the plurality of possible communication paths may consist of a wireless connection from site controller 150 to a wireless communication device associated with the specific sensor/actuator 130. Another possible communication path may consist of a wireless connection from site controller 150 to an intermediate wireless communication device and then to the wireless communication device associated with the specific sensor/actuator 130. Further communication paths may include multiple intermediate wireless communication devices in the wireless connection between site controller 150 and the wireless communication device associated with the specific sensor/actuator 130. In this manner, site controller 150 may communicate with sensors/actuators 130 and/or sensors 140 that are located a greater distance from the site controller 150 by having messages repeated by successive wireless communication devices along one of the communication paths.

FIG. 4 sets forth a format for the open data packet protocol of the present invention. All messages transmitted within automated monitoring system 100 consist of a "to" address 400, a "from" address 410, a packet number 420, a number of packets in a transmission 430, a packet length 440, a message number 450, a command number 460, data field 470, and a check sum error detector (CkH 480 and CkL 490).

The "to" address 400 indicates the intended recipient of the packet. This address can be scalable from one to six bytes based upon the size and complexity of the system. By way of example, the "to" address 400 can indicate a general message to all wireless communication devices, to only the stand-alone wireless communication devices, or to an individual integrated wireless communication device. In a six byte "to" address, the first byte indicates the type of the wireless communication device—to all wireless communication devices, to some wireless communication devices, or to a specific wireless communication device. The second byte can be the identification base, and bytes three through six can be used for the unique address of the wireless communication device (either stand-alone or integrated). The "to" address 400 is scalable from one byte to six bytes depending upon the intended recipient(s).

The "from" address 410 may be the six-byte unique address associated with the device from which the transmission originated. The "from" address 410 may be the address of the site controller 150 when the site controller 150 requests data, or this can be the address of one of the wireless communication devices responding to a request for information from the site controller 150.

The packet number 420, the packet maximum 430, and the packet length 440 may be used to concatenate messages that are greater than a predetermined byte length. The packet maximum 430 indicates the number of packets in the message. The packet number 420 may be used to indicate a packet sequence number for a multiple-packet message.

The message number 450 may originally be assigned by the site controller 150 Messages originating from the site controller 150 may be assigned an even number, while responses to the site controller 150 may be the original message number plus one, thereby rendering the responding message with an odd number. For example, the site controller 150 may increment the message number 450 by two for each new originating message. This enables the site controller to coordinate the incoming responses to the appropriate command message.

The command number 460 may designate a specific data request from the receiving device as necessary. One of ordinary skill in the art will appreciate that, depending on the specific implementation of automated monitoring system 100, the types of commands may differ. In one embodiment, there may be two types of commands: device specific and not device specific. Device specific commands may control a specific device, such as a data request or a change in current actuator settings. Commands that are not device specific may include, but are not limited to, a ping, an acknowledgement, a non-acknowledgement, downstream repeat, upstream repeat, read status, emergency message, and a request for general data to name a few. General data may include a software version number, the number of power failures, the number of resets, etc.

The data field 470 may contain data as requested by a specific command. The requested data may be any value. By way of example, test data may preferably be encoded in ASCII (American Standard Code for Information Interchange) or other known encoding systems as known in the art. The data field 470 of a single packet may be scalable up to a predetermined byte length. When the requested data exceeds the predetermined byte length, the integrated wireless communication device may divide the data into an appropriate number of sections and concatenate the series of packets for one message using the packet identifiers as discussed above.

The checksum fields 480 and 490 are used to detect errors in transmissions. In one embodiment, any error can be detected via cyclic redundancy check sum methodology. This methodology divides the message as a large binary number by the generating polynomial (in this case, CRC-16). The remainder of this division is then sent with the message as the checksum. The receiver then calculates a checksum using the same methodology and compares the two checksums. If the checksums do not match, the packet or message will be ignored. While this error detection methodology is preferred, one of ordinary skill in the art will appreciate that various other error detection methodologies may be implemented.

As stated above, automated monitoring system 100 may employ wireless and/or wired communication technologies for communication between site controller 150 and the wireless communication devices. In one embodiment, communication between site controller 150 and the wireless communication devices within coverage area 165 may be implemented using a wireless link having a basic rate of 4,800 bits per second (bps) and a data rate of 2400 bps. All the data may be encoded in the Manchester format such that a high to low transition at the bit center point represents a logic zero and a low to high transition represents a logic one. One of ordinary skill in the art will appreciate that other signal formats may be used as desired. By way of example, a quadature phase shift encoding method may be used, thereby enabling the site controller 150 to communicate via hexadecimal instead of binary. The site controller 150 may use any predetermined RF transmission method to transmit the messages. In one embodiment, a transmission frequency of approximately 916.5 MHz may be employed, although one of ordinary skill in the art will appreciate that any other frequency may be desirable. Alternatively, the transmission can be on a predetermined range of frequencies such as with spread spectrum technology. Furthermore, the message may be modulated using any technique, such as on-off keying, frequency modulation (FM), or any other modulation technique.

While the message indicates the specific byte length for each section, only the order of the specific information within the message is constant. The byte position number in individual transmissions may vary because of the scalability of "to" address 400, command number 460, and the scalability of data field 470.

The message may further include a preface and a postscript (not shown). The preface and postscripts need not be part of the message body, but rather provide synchronization and frame each packet of the message. The packet may begin with the preface and end with the postscript. The preface may be, for example, a series of twenty-four logic ones followed by two bit times of high voltage with no transition. The first byte of the packet may then follow immediately. The postscript may be, for example, a transition of the transmit data line from a high voltage to a low voltage. It may be less desirable to not leave the transmit data line high after the message is sent. Furthermore, one of ordinary skill in the art will appreciate that the preface and postscript may be modified in a number of ways.

FIG. 5 illustrates one embodiment of a byte assignment for the "to" address 400 of FIG. 4. One of ordinary skill in the art will appreciate that various byte assignments may be used within "to" address field 400. For example, in one embodiment, "to" address 400 consists of six bytes. The first byte (Byte 1) may indicate the device type. The second byte (Byte 2) may indicate the manufacturer or the owner. The third byte (Byte 3) may be a further indication of the manufacturer or owner. The fourth byte (Byte 4) may indicate either that the message is for all devices or that the message is for a particular device. If the message is for all devices, the fourth by may be a particular code. If the message is for a particular device, the fourth, fifth, and sixth bytes (Byte 5 and Byte 6) may include the unique identifier for that particular device.

Having described the general message structure for the open data packet protocol of the present invention, reference is directed to FIG. 6, which illustrates three sample messages. The first message 600 illustrates the broadcast of an emergency message "FF" from a central server with an address "0012345678" to a integrated transceiver with an address of "FF."

The second message 602 illustrates how the first message 600 may be sent to a stand-alone wireless communication device. In this manner, emergency message "FF" from a central server with address "00123456578" is first sent to stand-alone wireless device "FO." The second message 602, further contains additional command data "A000123456" that may be used by the wireless communication device to identify further wireless communication devices to send the signal through on the way to the destination device.

The third message 604 illustrates how the open data packet protocol of the present invention may be used to "ping" a remote wireless communication device in order to determine the status of the wireless communication device. In this manner, source unit "E112345678" originates a ping request by sending command "08" to a transceiver identified as "A012345678." The response to the ping request may be as simple as reversing the "to address" and the "from address" of the command such that a healthy wireless communication device may send a ping message back to the originating device. Automated monitoring system 100 may be configured to expect a return ping within a specific time period. Operators of automated monitoring system 100 may use the delay between the ping request and the ping response to model system loads and to determine if specific system parameters might be adequately monitored and controlled with the expected feedback transmission delay.

Further information regarding the structure and operation of the data packet protocol implemented in automated monitoring system 100 may be found in commonly assigned U.S. Patent Application "System and Method for Interconnecting Remote Devices in an Automated Monitoring System," (Ser. No. 09/925,445) which is hereby incorporated in its entirety by reference.

Referring again to FIG. 1, during normal operations, the site controller 150 acts as the communications master. Thus, the site controller 150 may initiate all communications with the wireless communications devices, except emergency messages described below. In addition to initiating command messages, the site controller 150 also tracks response messages. This tracking allows the site controller 150 to monitor the operational status of the wireless communication devices.

In addition to orchestrating communications with the wireless communication devices, the site controller 150 maintains current databases of information regarding the automated monitoring system 100, such as, for example, the function of the wireless communication devices, the unique address for each of the wireless communication devices, and current data contained in response messages. One of ordinary skill in the art will appreciate that site controller 150 may contain information related to any of a variety of other aspects of automated monitoring system 100.

As stated above, the site controller 150 also controls communications with the applications server 110. When communicating with the applications server 110, the site controller 150 receives requests for information, commands, etc. and sends the appropriate response. The applications server 110 maintains the requested information and/or commands in such a way that a user can access the information via a remote desktop 155, remote laptop 160, or any other device configured for communication with WAN 120.

Furthermore, the site controller 150 may be configured to maintain a database of the wireless communication devices and their unique addresses. The unique addresses may be assigned such that the site controller 150 may easily send messages to one wireless communication device, a group of wireless communication devices, or all of the wireless communication devices.

Using the site controller 150 as a communications master and maintaining individual device information at the site controller 150 enables the wireless communication devices to be simplified. The simplification of the wireless communication devices has two main advantages: (1) simplifying the construction of the wireless communication device and (2) decreasing cost. The wireless communication device may be simplified because of a reduced need for large memory and/or storage devices. As well-known in the art, memory and storage devices increase in cost as they increase in size. Therefore, decreasing the size of the memory and/or storage reduces the construction and operating costs of the wireless communication devices.

The site controller 150 sends messages to the wireless communication devices using the open data packet protocol described above. Initially, the site controller 150 maps all of the wireless communication devices so as to "learn" all the unique addresses and the necessary communication paths. To do this mapping, the site controller 150 issues a command to document the down-stream addresses and the upstream addresses for each communication path associated with a wireless communication device. The site controller 150 logs the response data from the wireless communication devices into the appropriate databases. Messages from the site controller 150 travel downstream to the intended wireless communication device(s). Messages from the wireless communication devices(s) travel upstream to the site controller 150. When mapping the communication paths for each of the wireless communication devices, the site controller 150 "learns" the unique address of each wireless communication device, the addresses of each wireless communication device that can directly and reliably communicate with each transceiver/repeater(s) 125 in a downstream path, the unique address of each transceiver/repeater(s) 125 in a downstream path, the upstream addresses for the wireless communication device, and the downstream addresses for the wireless communication device.

When sending command messages, the site controller 150 expects an acknowledgement to each command. A command is considered to be not acknowledged when either the site controller 150 fails to receive a positive acknowledgement from the addressed wireless communication device within a first time period, fails to detect the re-transmission of the command message by a transceiver/repeater 125 within a second time period, or receives a negative acknowledgement from a transceiver/repeater 125 in the communication path of the wireless communication device. If the site controller 150 receives a negative acknowledgement, the site controller 150 can then log the failed message and retransmit the message. This re-transmission can occur a predetermined number of times. It should be noted the first time period may be longer than the second time period. In the above cases, the first time period is long enough to ensure receipt of the preamble of the response message when there are multiple transceiver/repeater(s) 125 in the communications path. The second time period is long enough to either receive the preamble of the response message (if no repeaters are in the communications path) or to hear the preamble of the command message being re-transmitted by the first transceiver/repeater 125 in the communication path of the wireless communication device.

After initializing and during normal operation, the site controller 150 may poll each of the remote sensor/actuators according to a predetermined schedule. During this process, the site controller 150 requests the current operating status of each of the sensors/actuators 135. The status of a sensor/actuator device 135 depends upon the type of device. For example, a smoke detector's status may be operational/nonoperational. In contrast, a utility meter's status may be the utility usage that has occurred since the last polling. A thermostat's status response may be the actual temperature and the desired temperature. The information sent in response to a status poll may vary depending upon the particular configuration of the sensor/actuator 135. This information is maintained by the site controller 150 and may be sent to the applications server 110 upon request. The predetermined schedule has flexibility based upon the number of failed attempts and any emergency messages. To poll the device, the site controller 150 sends a "read status" message. The command message is considered complete upon receipt of the response message. The command message is considered failed upon receipt of a negative acknowledgement. After a negative acknowledgement, the site controller 150 retries the command six more times and logs all failed attempts.

To facilitate communications with the applications server 110, the site controller 150 may maintain database files of information. The site controller 150 may maintain communication databases that store the device failures, as discussed above, and that store the emergency messages. These database stored logs can contain the unique address of the wireless communication device, a code representing a present condition, and a date/time stamp. Any failures to communicate with the applications server 110 are also logged into the appropriate database. These databases may have a predetermined size and may be forwarded to the applications server 110 when the databases are a specific percentage full or upon request by the applications server 110. Once forwarded to and acknowledged by the applications server 110, the entries in the communications databases are deleted. One of ordinary skill in the art will appreciate that the contents, size, and scheduling of database entries may be varied in a variety of ways.

After mapping the wireless communication devices, the site controller 150 develops and maintains a database that includes the unique address for each wireless communication device, the number of transceiver/repeaters 125 in the downstream path, the address of each transceiver/repeater 125 in the downstream path, the upstream addresses, and the downstream addresses. The site controller 150 does not necessarily respond to the messages from wireless communication device s not listed in this database.

In addition to mapping the wireless communication devices, the site controller 150 may update the device database via the applications server 110. This update may add/delete wireless communication devices from the automated monitoring system 100, change the communications path of any or all of the wireless communication devices, or change the unique addresses of any or all of the wireless communication devices. Upon request of the applications server 110, the site controller 150 may transmit the device database to the applications server 110.

It should be noted that the databases enumerated above are merely exemplary, and other databases may be included as would be obvious to one of ordinary skill in the art.

The "normal" operating procedure described above is continued unless the site controller 150 receives an emergency message from a wireless communication device. The emergency message is transmitted unsolicited. The emergency message can be received by the site controller 150 either directly, via a repeater, or via a plurality of repeaters. Upon receipt of an emergency message, the site controller 150 immediately notifies the applications server 110 of the emergency message. In addition, the site controller 150 suspends the above polling for a predetermined time period. This suspension insures the receipt of any additional emergency messages. After the time period expires with no additional messages, the site controller 150 resumes polling.

To facilitate communications between the applications server 110 and the site controller 150, the site controller 110 maintains a database of contact information. By way of example, if the site controller 150 communicates via a network interface device 240, the site controller 150 can maintain a database of telephone numbers and IP addresses of the applications server 110.

During normal communications, the applications server 110 sends response messages. As stated above, one of ordinary skill in the art will appreciate that the applications server 110 and the site controller 150 may communicate via TCP/IP protocol or any other protocol. Exemplary requests include a "get file" request of the database and a "put file" request, which sends a file to the site controller 150.

Normal communications between the site controller 150 and the applications server 110 may also be interrupted by an emergency message. The emergency message originates at the site controller 150 and may include an emergency message from a remote device, a "file too large" message, and a site controller status change message to name a few. In the case of safety and security system devices such as smoke detectors, glass break alarms, etc., the site controller 150 may immediately generate an emergency message to the applications server 110 in the event a safety/security device fails to respond to a poll message.

One of ordinary skill in the art will appreciate that what has been described herein is a very top-level illustration of a system constructed in accordance with the automated monitoring system 100 of the present invention. In accordance with the invention, a variety of remote devices, such as utility meter devices, personal security devices, household devices and appliances, and other remote devices employing a sensor and/or an actuator, may be monitored and/or controlled from a remote location via a computing device connected to WAN 120. The data and command transmissions may be transmitted and received by the site controller 150 connected to WAN 120. Site controller 150 is further in communication with the wireless communication devices within coverage area 165. The data and command transmissions may be relayed via the various wireless communication devices defining the communication path until they reach a designated destination or the site controller 150.

It will be further appreciated that automated monitoring system 100 in accordance with the present invention may be used in a variety of environments. In one embodiment, automated monitoring system 100 may be employed to monitor and record utility usage by residential and industrial customers, to transfer vehicle diagnostics from an automobile via a wireless transceiver integrated with the vehicle diagnostics bus to a local transceiver that further transmits the vehicle information through a local gateway onto a WAN, to monitor and control all irrigation system, to automate a parking facility, to monitor and control a residential security system, etc, which are described in more detail in the commonly assigned U.S. patent application Ser. No. 09/704,150, and entitled, "System and Method for Monitoring and Controlling Residential Devices,", now U.S. Pat. No. 6,891,838, issued May 10, 2005.

Automated monitoring system 100 may be adapted to monitor and apply control signals in an unlimited number of applications. By way of example only, the wireless communication devices may be adapted for use with any associated device, such as, for example, pay type publicly located telephones, cable television set top boxes, utility meters, and residential appliances and/or devices to enable a remote controllable home automation and security system.

In a geographic area appropriately networked with permanently located stand-alone transceivers 125, personal transceivers (not shown) may be used to monitor and control personnel access and egress from specific rooms or portions thereof within a controlled facility. Personal transceivers may further be configured to transfer personal information to public emergency response personnel, to transfer personal billing information to vending machines, or to monitor individuals within an assisted living community.

Wireless communication devices using the open data packet protocol of the present invention may be integrated to monitor and control a host of industrial and business applications as well. By way of example only, building automation systems, fire control systems, alarm systems, industrial trash compactors, and building elevators may be monitored and controlled. In addition, courier drop boxes, time clock systems, automated teller machines, self-service copy machines, and other self-service devices may be monitored and controlled as appropriate. By way of further example, a number of environment variables that require monitoring may be integrated with automated monitoring system 100 to permit remote monitoring and control. For instance, light levels in the area adjacent to automated teller machines must meet minimum federal standards. Also, the water volume transferred by water treatment plant pumps, smokestack emissions from a coal burning power plant, or a coke fueled steel plant oven may be remotely monitored.

The wireless communication devices using the open data packet protocol of the present invention may be further integrated with a voice-band transceiver having multiple function buttons. As a result, when a person presses, for example, the emergency button on his/her transmitter, medical personnel, staff members, or others may respond by communicating via two-way radio with the party in distress. In this regard, each transceiver may be equipped with a microphone and a speaker that would allow a person to communicate information such as their present emergency situation, their specific location, etc.

Figure 7:
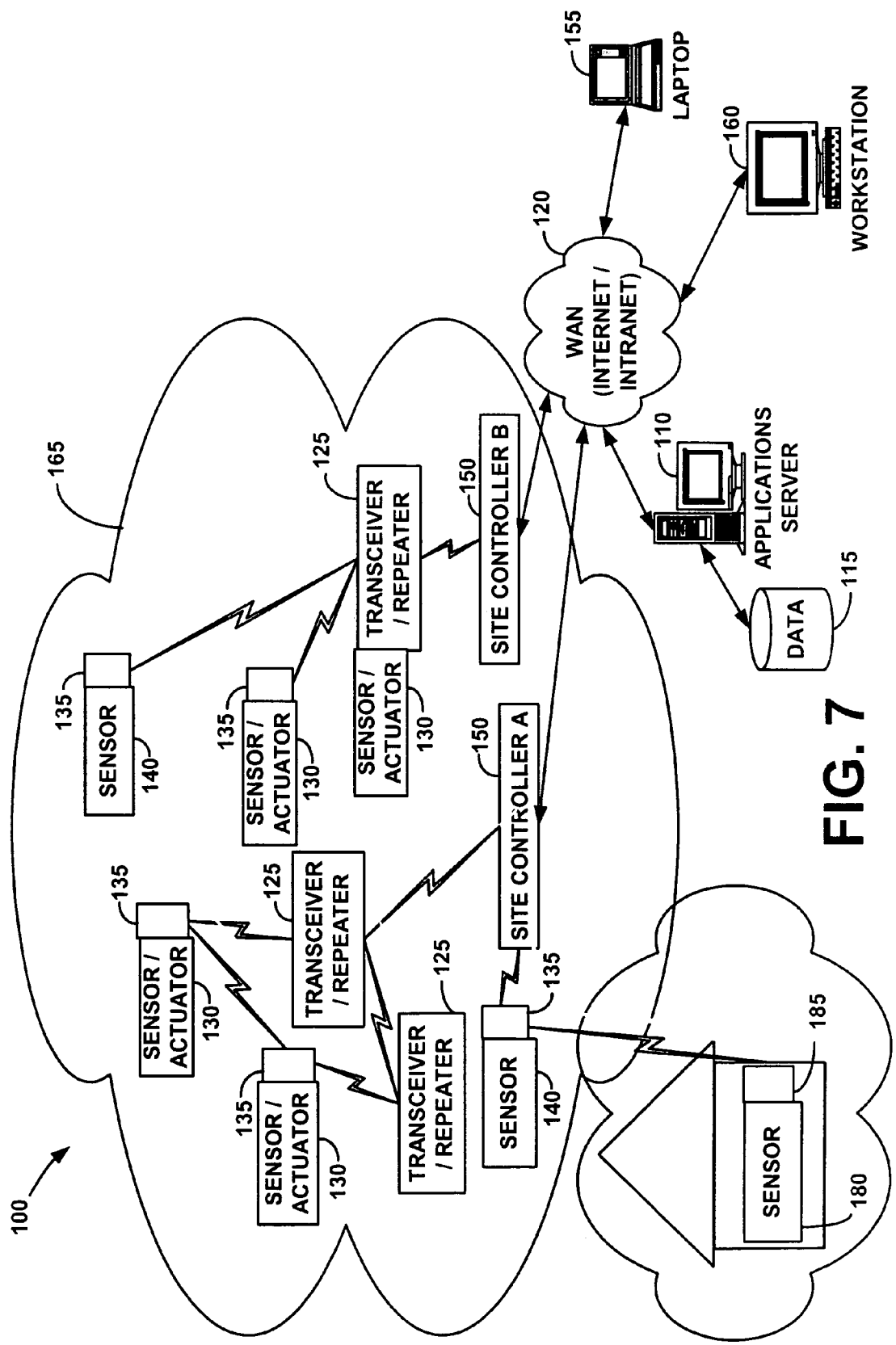
FIG. 7 illustrates another embodiment of the automated monitoring system according to the present invention.

As an example, FIG. 7 sets forth an alternate embodiment of an automated monitoring system 100. Automated monitoring system 100 of FIG. 1 is shown with an additional sensor 180 and transceiver 185. The additional sensor 180 and transceiver 185 are shown to be communicating with, but outside of, the coverage area 165. In this example, the additional sensor 180 and transceiver 185 may be placed outside of the original control system. In order to communicate, the coverage area of transceiver 185 need only overlap the coverage area 165. By way of example only, the original installation may be an automated monitoring system 100 that monitors electricity usage via the utility meters in an apartment complex. Later a neighbor in a single family residence nearby the apartment complex may remotely monitor and control their thermostat by installing a sensor/actuator transceiver according to the present invention. The transceiver 185 then communicates with the site controller 150 of the apartment complex. If necessary, repeaters (not shown) can also be installed to communicate between the transceiver 185 and the apartment complex site controller 150. Without having the cost of the site controller 150, the neighbor may enjoy the benefits of the control system.

The foregoing description has been presented for purposes of illustration and description. It is not intended to be exhaustive or to limit the invention to the precise forms disclosed. Obvious modifications or variations are possible in light of the above teachings. For example, it should be appreciated that, in some implementations, the transceiver unique address is not necessary to identify the location of the transceiver. Indeed, in implementations where the transceiver is permanently integrated into an alarm sensor other stationary device within a system, then the applications server 110 and/or the site controller 150 may be configured to identify the transmitter location by the transmitter unique address alone. It will be appreciated that, in embodiments that do not utilize wireless transceiver/repeaters 125, the wireless transmitters 145 and/or wireless transceivers 135 may be configured to transmit at a higher power level, in order to effectively communicate with the site controller 150.

The embodiment or embodiments discussed were chosen and described to illustrate the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A method for controlling communication with a host computer connected to a first communication network and a plurality of communication devices that define a second communication network associated with a plurality of remote devices that are to be monitored and controlled by the host computer, the method comprising the steps of:

sending a path determination message to a target communication device from a site controller through the second communication network prompting the target communication device to retransmit the path determination message to the site controller through the second communication network, generating a network map of all down-stream communication paths from the site controller to the target communication device and all up-stream communication paths from the target communication device to the site controller from the unique addresses of the communication devices that retransmitted the path determination message from the site controller to the target communication device or from the target communication device to the site controller, based on the network map, determining one or more up-stream and down-stream communication paths associated with each of the plurality of communication devices;

managing communication with each of the plurality of communication devices and the identification of each of the plurality of communication devices in the one or more communication paths, via a first communication protocol, based on one or more of the communication paths associated with each of the plurality of communication devices;

managing communication with the host computer via a second communication protocol;

storing on the site controller a first look-up table for identifying each of the plurality of communication devices that define a second communication network; and storing on the site controller a second look-up table for identifying a function to be performed by the site controller based upon an analysis of a message received from any one of the plurality of communication devices that define a second communication network.

2. The method of claim 1, wherein each of the plurality of communication devices are wireless communication devices, the plurality of wireless communication devices being disposed throughout a geographic area such that the antenna patterns associated with the plurality of wireless communication devices overlap to create a coverage area that defines the second communication network.

3. The method of claim 1, wherein the first communication network is a wide area network and the second communication protocol comprises TCP/IP.

4. The method of claim 1, further comprising the step of managing communication with each of the plurality of communication devices, via a first communication protocol, based on one or more of the communication paths associated with each of the plurality of communication devices wherein the first communication protocol comprises a data packet, the data packet comprising:
  a to address;
  a from address; and
  a command number comprising as function code.

5. The method of claim 4, wherein the data packet further comprises:
  a data field;
  a checksum field;
  a packet number field;
  a packet length field;
  a packet maximum field; and
  a message number field.

6. The method of claim 1, further comprising the steps of:
  receiving a request, via the first communication network, from the host computer for information related to one of the plurality of remote devices;
  providing a command message to the second communication network for delivery to the one of the plurality of remote devices based on one of the communication paths associated with the communication device corresponding to the one of the plurality of remote devices.

7. The method of claim 6, further comprising the step of receiving a response message, via the second communication network, that is generated by the communication device corresponding to the one of the plurality of remote devices, the response message comprising a first communication device identifier associated with the communication device associated with the one of the plurality of remote devices and a predetermined function code corresponding to a data signal provided by the one of the plurality of remote devices associated with the communication device that generated the response message; and
  determining, based on the first communication device identifier, the communication device that generated the first data signal.

8. The method of claim 7, comprising the step of providing the data signal to the first communication network for delivery to the host computer.

9. A method for controlling communication with a host computer connected to a first communication network and a plurality of communication devices that define a second communication network associated with a plurality of remote devices that are to be monitored and controlled by the host computer, the method comprising:
  sending a path determination message to each communication device from a site controller through the second communication network prompting each communication device to retransmit the path determination message to the site controller through the second communication network;
  generating a map of the entire network from the unique addresses of every communication device that retransmitted each path determination message from the site controller to each communication device or from each communication device to the site controller;
  based on the network map, determining one or more upstream and down-stream communication paths between the controller and each communication device;
  managing communication between the controller and each of the communication devices based upon the network map and through a first communication protocol;
  managing communication between the controller and the host computer through a second communication protocol;
  the site controller translating a message from the host computer to a communication device in the second communication network from the second communication protocol into the first communication protocol; and
  storing on the site controller a first look-up table for identifying each of the plurality of communication devices that define a second communication network; and
  storing on the site controller a second look-up table for identifying a function to be performed by the site controller based upon an analysis of a message received from any one of the plurality of communication devices that define a second communication network.

10. The method of claim 9 further comprising, the site controller translating a message from a communication device in the second communication network to the host computer from the first communication protocol into the second communication protocol.

11. The method of claim 9, wherein a message from any one of the communication devices that define a second communication network to the host computer contains a preface and a postscript.

12. The method of claim 9, wherein the first communication protocol is an open data packet protocol.

* * * * *